US012083539B2

(12) United States Patent
Bourke et al.

(10) Patent No.: US 12,083,539 B2
(45) Date of Patent: Sep. 10, 2024

(54) FLOTATION LINE

(71) Applicant: Metso Outotec Finland Oy, Tampere (FI)

(72) Inventors: Peter Bourke, Perth (AU); Steve Schmidt, Corinda (AU); Antti Rinne, Espoo (FI); Rob Coleman, The Gap (AU)

(73) Assignee: Metso Outotec Finland Oy, Tampere (FI)

( * ) Notice: Subject to any disclaimer, the term of this patent is extended or adjusted under 35 U.S.C. 154(b) by 821 days.

(21) Appl. No.: 17/264,641

(22) PCT Filed: Aug. 1, 2018

(86) PCT No.: PCT/FI2018/050566

§ 371 (c)(1),
(2) Date: Jan. 29, 2021

(87) PCT Pub. No.: WO2020/025851

PCT Pub. Date: Feb. 6, 2020

(65) Prior Publication Data

US 2021/0308695 A1 Oct. 7, 2021

(51) Int. Cl.
*B03D 1/14* (2006.01)
*B03D 1/02* (2006.01)
*B03D 1/24* (2006.01)

(52) U.S. Cl.
CPC ............ *B03D 1/1456* (2013.01); *B03D 1/02* (2013.01); *B03D 1/1462* (2013.01); *B03D 1/1475* (2013.01); *B03D 1/242* (2013.01)

(58) Field of Classification Search
CPC .................................................... B03D 1/1456
See application file for complete search history.

(56) References Cited

U.S. PATENT DOCUMENTS

2006/0151360 A1 * 7/2006 Wright .................... C02F 1/683
208/390

FOREIGN PATENT DOCUMENTS

| | | |
|---|---|---|
| CL | 201900408 | 2/2019 |
| CL | 201900409 | 2/2019 |
| CL | 201902138 | 7/2019 |
| CL | 201902140 | 7/2019 |
| CL | 201902141 | 7/2019 |

(Continued)

OTHER PUBLICATIONS

Machine translation of CN 107377235.*

(Continued)

*Primary Examiner* — Peter Keyworth
(74) *Attorney, Agent, or Firm* — Andrus Intellectual Property Law, LLP

(57) ABSTRACT

A flotation line for treating mineral ore particles suspended in slurry is disclosed. The flotation line includes a scavenger part and a scavenger cleaner part. The flotation line is characterized in that the scavenger part or the scavenger cleaner part includes a flotation cell with blast tubes for introducing slurry infeed into the flotation cell; or in that the scavenger part or the scavenger cleaner part is followed by a flotation cell with blast tubes for introducing slurry infeed into the flotation cell. Further, a use of the flotation line is presented, as well as a flotation plant including a flotation line according to the invention.

33 Claims, 4 Drawing Sheets

(56) References Cited

FOREIGN PATENT DOCUMENTS

| | | | | |
|---|---|---|---|---|
| CL | 201902142 | | | 7/2019 |
| CL | 2019002137 | | | 10/2019 |
| CL | 202100239 | | | 8/2021 |
| CL | 202100241 | | | 8/2021 |
| CN | 102240610 | A | | 11/2011 |
| CN | 105562216 | A | | 5/2016 |
| CN | 107377235 | A | * | 11/2017 |
| WO | 2006081611 | A1 | | 8/2006 |
| WO | 2012054953 | A1 | | 5/2012 |
| WO | 2015162340 | | | 10/2015 |
| WO | 2015162340 | A1 | | 10/2015 |
| WO | 2018033658 | A1 | | 2/2018 |

OTHER PUBLICATIONS

Office Action for Brazilian Patent Application No. BR112021001871-9, mailed Jul. 4, 2022.

Jameson et al. "New Directions in Flotation Machine Design", Minerals Engineering, vol. 23, Nos. 11-13 Elsevier, Amsterdam, NL, published Oct. 1, 2010.

Li et al. "Industrial Application of a Modified Pilot-Scale Jameson Cell for the Flotation of Spodumene Ore in High Altitude Area", Powder Technology, vol. 320, pp. 358-361, Elsevier, Basel, Switzerland, published Jul. 23, 2017.

Extended European Search Report for European Application No. 18928355.9, mailed Mar. 17, 2022.

International Search Report and Written Opinion for International Patent Application No. PCT/FI2018/050566 mailed Nov. 23, 2018.

Search Report for Chilean Utility Model Application 201902137 dated Aug. 14, 2020.

Zhengchang Shen; "Technology of col. Flotation" Metallurgical Industry Press, pp. 211-214, 2015, Beijing, China.

Ai Guanghua; "Copper Ore Processing Technology and Practice" Metallurgical Industry Press, pp. 66-74, 2017 Beijing, China.

Chilean Search Report for Chilean Patent Application No. 202100250, mailed Sep. 5, 2022.

* cited by examiner

FLOTATION LINE

CROSS-REFERENCE TO RELATED APPLICATIONS

This application is the U.S. national stage application of International Application PCT/F12018/050566, filed Aug. 1, 2018, which international application was published on Feb. 6, 2020, as International Publication WO 2020/025851 A1 in the English language.

TECHNICAL FIELD

The current disclosure relates to a flotation line for separating valuable metal containing ore particles from ore particles suspended in slurry. Further, the use of the flotation line, and a flotation plant are disclosed.

SUMMARY OF THE INVENTION

The flotation line according to the current disclosure is characterized by what is presented in claim 1.

Use of the flotation line according to the current disclosure is characterized by what is presented in claim 29.

The flotation plant according to the current disclosure is characterized by what is presented in claim 36.

The flotation line is provided for treating mineral ore particles suspended in slurry. The flotation line comprises a scavenger part with a scavenger flotation cell for the separation of slurry into underflow and overflow; and a scavenger cleaner part comprising a scavenger cleaner flotation cell for the separation of slurry into overflow and underflow, wherein overflow from a scavenger flotation cell is arranged to flow into a regrinding step and then into the scavenger cleaner flotation part; underflow from a last scavenger flotation cell of the flotation line and a last scavenger cleaner flotation cell of the flotation line is arranged to be removed from the flotation line as tailings; at least 30% of the flotation volume in the flotation line comprises a mechanical agitator comprising a system for introducing flotation gas into the flotation cell; and the flotation cells of the flotation line are connected in series and arranged in fluid communication so that a subsequent flotation cell is arranged to receive underflow from a previous flotation cell as slurry infeed. The flotation line is characterized in that the scavenger part or the scavenger cleaner part comprises a flotation cell with blast tubes for introducing slurry infeed into the flotation cell; or in that the scavenger part or the scavenger cleaner part is followed by a flotation cell with blast tubes for introducing slurry infeed into the flotation cell; a flotation cell with blast tubes configured to receive underflow from a scavenger flotation cell or a scavenger cleaner flotation cell as slurry infeed; and a blast tube configured to restrict flow of slurry infeed from an outlet nozzle, and to maintain slurry infeed under pressure in the blast tube.

According to an aspect of the invention, use of the flotation line according to the invention is intended for recovering particles comprising a valuable material suspended in slurry.

According to a further aspect of the invention, a flotation plant is provided, comprising a flotation line according to the invention.

With the invention described herein, the recovery of fine particles in a flotation process may be improved. The particles may, for example, comprise mineral ore particles such as particles comprising a metal.

In froth flotation for mineral ore, upgrading the concentrate is directed to an intermediate particle size range between 40 μm to 150 μm. Fine particles are thus particles with a diameter of 0 to 40 μm, and ultrafine particles can be identified as falling in the lower end of the fine particle size range. Coarse particles have a diameter greater than 150 μm. In froth flotation of coal, upgrading the concentrate is directed to an intermediate particle size range between 40 μm to 300 μm. Fine particles in coal treatment are particles with a diameter of 0 to 40 μm, and ultrafine particles those that fall into the lower end of the fine particle size range. Coarse coal particles have a diameter greater than 300 μm.

Recovering very coarse or very fine particles is challenging, as in a traditional mechanical flotation cell, fine particles are not easily entrapped by flotation gas bubbles and may therefore become lost in the tailings. Typically in froth flotation, flotation gas is introduced into a flotation cell or tank via a mechanical agitator. The thus generated flotation gas bubbles have a relatively large size range, typically from 0.8 to 2.0 mm, or even larger, and are not particularly suitable for collecting particles having a finer particle size.

Fine particle recovery may be improved by increasing the number of flotation cells within a flotation line, or by recirculating the once-floated material (overflow) or the tailings flow (underflow) back into the beginning of the flotation line, or to precedent flotation cells. A cleaner flotation line may be used in order to improve recovery of fine particles. In addition, a number of flotation arrangements employing fine flotation gas bubbles or even so-called microbubbles have been devised. Introduction of these smaller bubbles or microbubbles may be done prior to feeding the slurry into the flotation cell, i.e. the ore particles are subjected to fine bubbles in a feed connection or the like to promote formation of ore particle-fine bubble agglomerates, which may then be floated in flotation cells such as flash flotation cells or column cells. Alternatively, fine bubbles or microbubbles may be introduced directly into the flotation cell, for example by spargers utilising cavitation. These kinds of solutions are not necessary feasible in connection with mechanical flotation cells, as the turbulence caused by mechanical agitation may cause the ore particle-fine bubble agglomerates to disintegrate before they are able to rise into the froth layer to be collected into overflow and thus recovered.

Column flotation cells act as three phase settlers where particles move downwards in a hindered settling environment counter-current to a flow of rising flotation gas bubbles generated by spargers located near the bottom of the cell. While column flotation cells may improve the recovery of finer particles, the particle residence time is dependent on settling velocity, which may impact on the flotation of large particles. In other words, while the aforementioned flotation solutions may have a beneficial effect for recovery of fine particles, the overall flotation performance (recovery of all valuable material, grade of recovered material) may be undermined by the negative effect on recovery of larger particles.

To overcome the above problems, so-called pneumatic flotation cells are used, where flotation gas is introduced in a high-shear device such as a downcomer with slurry infeed, thereby creating finer flotation gas bubbles that are able to entrap also finer particles already during the bubble formation in the downcomer. However, such high-throughput flotation cells may require a vacuum to be created in the downcomer to effectively achieve the required bubble formation rate to entrap the desired particles in the short time slurry infeed resides in the downcomer.

Once having exited the downcomer, the flotation gas bubble-particle agglomerates rise immediately towards the froth layer on the top part of the flotation cell, and no further entrapment of particles take place in the part of the flotation cell downwards from the downcomer outlet. This may lead to significant part of particles comprising a desired material (mineral) to simply drop to the bottom of the flotation tank and ending up in tailings, which reduces the recovery rate of the flotation cell.

However, typically the so-called high-throughput flotation cells or pneumatic flotation cells of the Jameson cell type do not include any flow restriction for controlling the pressure within the downcomer after the formation of flotation air bubble-particle agglomerates has taken place. Such control of pressure is advantageous also in view of the pressure at which flotation gas bubbles are formed (effect on bubble size), but also for the adjustment of relative pressure at which they are to be used in the flotation tank. In that way, the coalescence of bubbles may be minimized after their formation. This is especially advantageous, as the rate of entrapment of particles by flotation gas bubbles decreases as the bubble size increases (provided that the air to liquid ratio remains the same).

In addition, the so-called high-throughput flotation cells may be used in coal liberation operations, where there typically is a flotation line comprising one or two such flotation cells at the end of the liberation circuit for the recovery of especially fine coal particles. In the liberation circuit, a process water recirculation system circulating water from the end part of the circuit (i.e. from the flotation line and a dewatering circuit) back to the front circuit (beginning of the liberation circuit). Flotation chemicals, especially frothers, typically cause problems in the processes downstream of the flotation circuit.

The problems may be alleviated to some extent by minimizing the use of frothers in the flotation line, but if not enough frother is added into the flotation process, the froth formation in downcomers according to state of the art may suffer, which leads to unstable process conditions and especially unstable downcomer operation and froth layer in a flotation cell, which in turn affects the recovery of desired particles negatively. Recovery of particles within the entire particle size distribution of a slurry is affected as bubble size increases with lower frother dosage, in particular that of coarse particles.

In prior art downcomers, flotation gas is introduce in a self-aspirating manner due to the formation of a vacuum within the downcomer. There is a very short residence time of flotation air to be entrained into the slurry (3 to 5 seconds), so the system is very sensitive to process variations. Frothers need to be constantly added to overcome the effect of restriction to air flowrate needed to maintain or even increase the vacuum inside the downcomer to keep the conditions as constant as possible for bubble-particle engagement, as frothers prevent bubbles from coalescing and rising back into the airspace not filled by slurry inside the downcomer. However, adding an amount of frothers required by the steady utilization of a prior art downcomer creates problems in other parts of the process, particularly in coal operations, as described above. Therefore the solution has been to decrease the frother dosage, which affects the downcomer vacuum, bubble formation, as well as bubble size and surface area negatively, and decreases recovery of desired particles significantly, making the high-throughput flotation cells known in the prior art inefficient in that application.

By using a flotation line according to the present invention, the amount of frother required to optimize the flotation process may be significantly reduced without significantly compromising bubble formation, bubble to particle engagement, stable froth layer formation or the recovery of desired material. At the same time, problems associated with recirculating process water from downstream circuit to front circuit can be alleviated. A blast tube operating under pressure is completely independent of the flotation tank. A better flotation gas flowrate may be reached, and finer bubbles created, and frother usage optimized, as the blast tube operation is not dependent of frother dosage.

In the solutions known from prior art, problems relate especially to limitations to the amount of flotation gas that can be supplied relative to the amount of liquid flowing through the downcomer, and to the need for relatively high concentrations of frothers or other expensive surface-active agents to produce small bubbles. With the invention presented here, flotation of fine and ultrafine particles comprising for example mineral ore or coal may be improved by reducing the size of the flotation gas bubbles introduced to slurry infeed in a blast tube, by increasing the flotation gas supply rate relative to the flow rate of particles suspended in the slurry, and by increasing the shear intensity or energy dissipation rate either in or adjacent to the blast tube. The probability of finer particles attaching to or being entrapped by smaller flotation gas bubbles is increased, and the recovery rate of desired material such as a mineral or coal, improved. In a flotation cell according to the invention, sufficiently small flotation gas bubbles, so-called ultra-fine bubbles, may be created to ensure efficient entrapment of fine ore particles. Typically, ultra-fine bubbles may have a bubble size distribution of 0.05 mm to 0.7 mm. For example, decreasing the mean flotation gas bubble size to a diameter of 0.3 to 0.4 mm means that the number of bubbles in 1 $m^3$ of slurry may be as high as 30 to 70 million, and the total mean surface area of the bubbles 15 to 20 $m^2$. In contrast, if the mean bubble size is around 1 mm, the number of bubbles in 1 $m^2$ of slurry is around 2 million, and the total mean surface area 6 $m^2$. In the flotation cell according to the invention it may thus be possible to reach 2.5 to 3 times higher bubble surface area than in flotation cells according to prior art solutions. It goes without saying that the effect of such increase in bubble surface area in recovery of valuable material comprising particles is significant.

At the same time, recovery of coarser particles may be kept at an acceptable level by achieving a high flotation gas fraction in the slurry, and by the absence of high turbulence areas in the region below the forth layer. In other words, the known benefits of mechanical flotation cells may be employed, even though there may not necessarily be any mechanical agitation present in the flotation cell. Further, the upwards motion of slurry or pulp within the flotation tank increases the probability of also coarser particles rise towards the froth layer with the flow of slurry.

One of the effects that may be gained with the present invention is the increased depth or thickness of a froth layer. A thicker froth layer contributes to higher grade, but also to increased recovery of smaller particles, and a separate froth washing step, typical for column flotation cells, may be discarded.

By disposing a number of blast tubes into a flotation cell in a flotation line according to the invention, the probability of collisions between flotation gas bubbles, as well as between gas bubbles and particles can be increased. Having a number of blast tubes may ensure an improved distribution of flotation gas bubbles within a flotation tank, and the bubbles exiting the blast tubes are distributed evenly throughout the flotation tank, the distribution areas of individual blast tubes have the possibility of intersecting each other and converging, thus promoting an extensively even flotation gas bubble distribution into the flotation tank, which in turn may affect the recovery of especially smaller particles beneficially, and also contribute to the aforementioned even and thick froth layer. When there are several blast tubes, collisions between flotation gas bubbles and/or particles in the slurry infeed from different blast tubes are promoted as the different flows intermingle and create local mixing subzones. As the collisions are increased, more bubble-particle agglomerates are created and captured into the froth layer, and therefore recovery of valuable material may be improved.

By generation of fine flotation gas bubble or ultra-fine bubbles, by bringing them into contact with the particles, and by controlling the flotation gas bubble-particle agglomerates-liquid mixture of slurry, it may be possible to maximize the recovery of hydrophobic particles into the forth layer and into the flotation cell overflow or concentrate, thus increasing the recovery of desired material irrespective of its particle size distribution within the slurry. It may be possible to achieve a high grade for a part of the slurry stream, and at the same time, high recovery for the entire slurry stream passing through a flotation line.

By disposing the outlet nozzles of the blast tubes at a suitable depth, i.e. disposing them at a specific vertical distance from the launder lip, the distribution of flotation gas bubble may be optimized in an even and constant manner. As the residence time of bubbles within a mixing zone may be kept high enough by a suitable depth of the blast tube outlet nozzles, the bubbles may be able to contact and adhere to the fine particles in the slurry efficiently, thus improving the recovery of smaller particles, and also promoting froth depth, stability and evenness at the top of the flotation tank.

By a mixing zone is meant herein a vertical part or section of the flotation tank in which active mixing of particles suspended in slurry with flotation gas bubbles takes place. In addition to this mixing zone created into an entire vertical section of the flotation tank, separate and regional individual mixing subzones may be created at areas where slurry flows directed radially outwards by individual impingers meet and become intermingled. This may further promote contacts between flotation gas bubbles and particles, thereby increasing the recovery of valuable particles. Further, this additional mixing may eliminate the need for a mechanical mixer for suspending solids in the slurry.

By a settling zone is meant a vertical part of section of the flotation tank in which particles not associated with flotation gas bubbles or otherwise not able to rise towards the froth zone on the top part of the flotation tank descend and settle towards the tank bottom to be removed in the tailings as underflow. The settling zone is below the mixing zone.

By disposing a tailings outlet at the side wall of the flotation tank, underflow may be removed at a zone where the slurry by most parts comprises particles descending or settling towards the tank bottom. The settling zone is deeper near the side wall of the flotation tank. At this area, mixing action and turbulence created by the blast tubes does not affect the settling particles, which, for the most part, do not comprise any valuable material, or comprise only a very small amount of valuable material. At this part, the settling action is also most pronounced due to the lack of turbulence interfering the descent by gravity of the particles. In addition, friction forces created by the tank side wall further decrease the turbulence and/or flows. Thus, taking underflow out of the flotation tank at a position arranged on this relatively calm settling zone, it may be ensured that as little as possible of the valuable material comprising particles are removed from the flotation tank—these particles should, rather, be floated, or, if for some reason having ended up in the settling zone, recirculated back into the flotation tank as slurry infeed through the blast tubes. Further, by removing underflow from the settling zone near the side wall of the flotation tank, the entire volume of the flotation tank may be efficiently utilized—there is no need to configure a separate lower settling zone below the blast tubes, as is the case in for example a Jameson cell. In some embodiments, it is even foreseeable that the volume of the flotation tank may be decreased at the centre of then tank, thereby decreasing the volume of the settling zone where the turbulence caused by slurry infeed from the blast tubes may influence the probability of particles settling towards the bottom of the tank, and allowing full use of the flotation tank volume. The volume of the flotation tank may be decreased at the centre of the tank for example by arranging a bottom structure at the flotation tank bottom, at the centre of the tank. In addition, it may be possible to dispose the blast tubes (the outlet nozzles) relatively deep into the flotation tank, and still ensure a sufficient calm settling zone at the side wall of the flotation tank. Also this further promotes to the efficient use of the entire volume of the flotation tank.

The flotation line, its use, and the flotation plant according to the invention have the technical effect of allowing the flexible recovery of various particle sizes, as well as efficient recovery of valuable mineral containing ore particles from poor ore raw material with relatively low amounts of valuable mineral initially. The advantages provided by the structure of the flotation line allow the accurate adjustment of the flotation line structural parameters according to the target valuable material at each installation.

By treating the slurry according to the present invention as defined by this disclosure, recovery of valuable material containing particles may be increased. The initial grade of recovered material may be lower, but the material (i.e. slurry) is also thus readily prepared for further processing, which may include for example regrinding and/or cleaning.

The favourable effects are especially pronounced by disposing a flotation cell with blast tubes in the scavenger part or in the scavenger cleaner part of the flotation line; or right after those two alternative parts. A relatively high amount of valuable material may have already been recovered in the preceding rougher part, and/or the first flotation cell or cells of the scavenger/scavenger cleaner parts, and the recovery of remaining valuable material in slurry, which may be challenging with conventional solutions, especially from poor quality ores. By arranging a flotation cell with blast tubes into a flotation line according to the invention, recovery of hard-to float particles at the downstream end of a flotation line may be improved in addition to the normal grade-improving nature of a scavenger/scavenger cleaner operation.

In this disclosure, the following definitions are used regarding flotation.

Basically, flotation aims at recovering a concentrate of ore particles comprising a valuable mineral. By concentrate herein is meant the part of slurry recovered in overflow or underflow led out of a flotation cell. By valuable mineral is meant any mineral, metal or other material of commercial value.

Flotation involves phenomena related to the relative buoyancy of objects. The term flotation includes all flotation techniques. Flotation can be for example froth flotation, dissolved air flotation (DAF) or induced gas flotation. Froth flotation is a process for separating hydrophobic materials from hydrophilic materials by adding gas, for example air or nitrogen or any other suitable medium, to the process. Froth flotation could be made based on natural hydrophilic/hydrophobic difference or based on hydrophilic/hydrophobic differences made by addition of a surfactant or collector chemical. Gas can be added to the feedstock subject of flotation (slurry or pulp) by a number of different ways.

A flotation cell meant for treating mineral ore particles suspended in slurry by flotation. Thus, valuable metal-containing ore particles are recovered from ore particles suspended in slurry. By flotation line herein is meant a flotation arrangement where a number of flotation cells are arranged in fluid connection with each other so that the underflow of each preceding flotation cell is directed to the following or subsequent flotation cell as a infeed until the last flotation cell of the flotation line, from which the underflow is directed out of the line as tailings or reject flow. Slurry is fed through a feed inlet to the first flotation cell of the flotation line for initiating the flotation process. A flotation line may be a part of a larger flotation plant or arrangement containing one or more flotation lines. Therefore, a number of different pre-treatment and post-treatment devices or stages may be in operational connection with the components of the flotation arrangement, as is known to the person skilled in the art.

The flotation cells in a flotation line are fluidly connected to each other. The fluid connection may be achieved by different lengths of conduits such as pipes or tubes, the length of the conduit depending on the overall physical construction of the flotation arrangement. In between the flotation cells of a flotation line, pumps or grinding/regrinding units may also be arranged. Alternatively, the flotation cells may be arranged in direct cell connection with each other. By direct cell connection herein is meant an arrangement, whereby the outer walls of any two subsequent flotation cells are connected to each other to allow an outlet of a first flotation cell to be connected to the inlet of the subsequent flotation cell without any separate conduit. A direct contact reduces the need for piping between two adjacent flotation cells. Thus, it reduces the need for components during construction of the flotation line, speeding up the process. Further, it might reduce sanding and simplify maintenance of the flotation line. The fluid connections between flotation cells may comprise various regulation mechanisms.

By "neighbouring", "adjacent", or "adjoining" flotation cell herein is meant the flotation cell immediately following or preceding any one flotation cell, either downstream or upstream, or either in a rougher flotation line, in a scavenger flotation line, or the relationship between a flotation cell of a rougher flotation line and a flotation cell of a scavenger flotation line into which the underflow from the flotation cell of the rougher flotation line is directed.

By a flotation cell is herein meant a tank or vessel in which a step of a flotation process is performed. A flotation cell is typically cylindrical in shape, the shape defined by an outer wall or outer walls. The flotation cells regularly have a circular cross-section. The flotation cells may have a polygonal, such as rectangular, square, triangular, hexagonal or pentagonal, or otherwise radially symmetrical cross-section, as well. The number of flotation cells may vary according to a specific flotation line and/or operation for treating a specific type and/or grade of ore, as is known to a person skilled in the art.

The flotation cell may be a froth flotation cell, such as a mechanically agitated cell, for example a TankCell, a column flotation cell, a Jameson cell, or a dual flotation cell. In a dual flotation cell, the cell comprises at least two separate vessels, a first mechanically agitated pressure vessel with a mixer and a flotation gas input, and a second vessel with a tailings output and an overflow froth discharge, arranged to receive the agitated slurry from the first vessel. The flotation cell may also be a fluidized bed flotation cell (such as a HydroFloat™ cell), wherein air or other flotation gas bubbles which are dispersed by the fluidization system percolate through the hindered-setting zone and attach to the hydrophobic component altering its density and rendering it sufficiently buoyant to float and be recovered. In a fluidized bed flotation cell axial mixing is not needed. The flotation cell may also be an overflow flotation cell operated with constant slurry overflow. In an overflow flotation cell, the slurry is treated by introducing flotation gas bubbles into the slurry and by creating a continuous upwards flow of slurry in the vertical direction of the first flotation cell. At least part of the valuable metal containing ore particles are adhered to the gas bubbles and rise upwards by buoyancy, at least part of the valuable metal containing ore particles are adhered to the gas bubbles and rise upwards with the continuous upwards flow of slurry, and at least part of the valuable metal containing ore particles rise upwards with the continuous upwards flow of slurry. The valuable metal containing ore particles are recovered by conducting the continuous upwards flow of slurry out of the at least one overflow flotation cell as slurry overflow. As the overflow cell is operated with virtually no froth depth or froth layer, effectively no froth zone is formed on the surface of the pulp at the top part of the flotation cell. The froth may be non-continuous over the cell. The outcome of this is that more valuable mineral containing ore particles may be entrained into the concentrate stream, and the overall recovery of valuable material may be increased.

Depending on its type, the flotation cell may comprise a mixer for agitating the slurry to keep it in suspension. By a mixer is herein meant any suitable means for agitating slurry within the flotation cell. The mixer may be a mechanical agitator. The mechanical agitator may comprise a rotor-stator with a motor and a drive shaft, the rotor-stator construction arranged at the bottom part of the flotation cell. The cell may have auxiliary agitators arranged higher up in the vertical direction of the cell, to ensure a sufficiently strong and continuous upwards flow of the slurry.

A flotation cell may comprise one or more froth crowders. A froth crowder herein is meant a froth blocker, a froth baffle, or a crowding board, or a crowding board device, or any other such structure or side structure, for example a sidewall, inclined or vertical, having a crowding effect, i.e. a crowding sidewall, which can also be a crowding sidewall internal to the flotation tank, i.e. an internal perimeter crowder.

By utilising a crowder, it may be possible to direct so-called "brittle froth", i.e. a loosely textured froth layer comprising generally larger flotation gas bubbles agglomerated with the mineral ore particles intended for recovery, more efficiently and reliably towards the forth overflow lip and froth collection launder. A brittle froth can be easily broken, as the gas bubble-ore particle agglomerates are less stable and have a reduced tenacity. Such froth or forth layer cannot easily sustain the transportation of ore particles, and especially coarser particles, towards the froth overflow lip for collection into the launder, therefore resulting in particle drop-back to the pulp or slurry within the flotation cell or tank, and reduced recovery of the desired material. Brittle froth is typically associated with low mineralization, i.e. gas bubble-ore particle agglomerates with limited amount of ore particles comprising a desired mineral that have been able to attach onto the gas bubbles during the flotation process within a flotation cell or tank. The problem is especially pronounced in large-sized flotation cells or tanks with large volume and/or large diameter. With the invention at hand, it may be possible to crowd and direct the froth towards the froth overflow lip, to reduce the froth transportation distance (thereby reducing the risk of drop-back), and, at the same time, maintain or even reducing the overflow lip length. In other words, the handling and directing of the froth layer in a froth flotation cell or tank may become more efficient and straightforward.

It may also be possible to improve froth recovery and thereby valuable mineral particle recovery in large flotation cells or tanks from brittle froth specifically in the later stages of a flotation line, for example in the rougher and/or scavenger stages of a flotation process.

Further, with the invention described herein, the area of froth on the surface of the slurry inside a flotation tank may be decreased in a robust and simple mechanical manner. At the same time, the overall overflow lip length in a froth flotation unit may be decreased. Robust in this instance is to be taken to mean both structural simplicity and durability. By decreasing the froth surface area of a flotation unit by a froth crowder instead of adding extra froth collection launders, the froth flotation unit as a whole may be a simpler construction, for example because there is no need to lead the collected froth and/or overflow out of the added crowder. In contrast, from an extra launder, the collected overflow would have to be led out, which would increase the constructional parts of the flotation unit.

Especially in the downstream end of a flotation line, the amount of desired material that can be trapped into the froth within the slurry may be very low. In order to collect this material from the froth layer to the froth collection launders, the froth surface area should be decreased. By arranging a froth crowder into the flotation tank, the open froth surface between the forth overflow lips may be controlled. The crowder may be utilised to direct or guide the upwards-flowing slurry within the flotation tank closer to a froth overflow lip of a froth collection launder, thereby enabling or easing froth formation very close to the froth overflow lip, which may increase the collection of valuable ore particles. The froth crowder may also influence the overall convergence of flotation gas bubbles and/or gas bubble-ore particle agglomerates into the froth layer. For example, if the gas bubbles and/or gas bubble-ore particle agglomerate flow becomes directed towards the centre of a flotation tank, a froth crowder may be utilised to increase the froth area at the perimeter of the tank, and/or closer to any desired froth overflow lip. In addition, it may be possible to reduce the open froth surface in relation to the lip length, thereby improving the efficiency of recovery in the froth flotation cell.

A flotation cell may comprise a bottom structure arranged on the bottom of the flotation tank, and having a shape that allows particles suspended in slurry to be mixed in a mixing zone created by the flow of slurry infeed from the outlet nozzles of the blast tubes over the bottom structure; and to settle down in a settling zone surrounding the bottom structure.

By arranging a bottom structure at the bottom of a flotation tank, the bottom structure extending upwards in the flotation tank, it may be possible to obtain better distribution of fine and/or small particles suspended in slurry. At the centre of the flotation tank, particles cannot descend and settle, as the flow of slurry infeed from the blast tubes may reach the raised centre part of the flotation tank, which ensures good mixing at that part. Particles that may have already detached from flotation gas bubbles and began their descent may be recaptured by the bubbles on account of the turbulent conditions in the mixing zone. On the other hand, the flotation tank bottom nearer the tank perimeter has a zone of a sufficient depth that allows for unfloated, most likely valueless particles to settle down and descend to be efficiently removed from the flotation tank. This settling zone is not affected by the slurry infeed flow from the blast tubes. Further, such relatively calm zone may inhibit formation of short circuiting of the slurry flows within the flotation tank, where the same slurry material keeps recirculating within the tank without being properly separated or settled. The above features may promote increased recovery of fine particles.

By arranging the bottom structure to have a certain size, especially in respect to the mixing zone, the mixing zone and the settling zone may be designed to have desired characteristics (size, depth, turbulence, residence time of particles in the mixing zone, settling speed and probability of valueless fraction in the settling zone etc.). In a conventional flotation cell, a majority of this area (without any mechanical mixing at the bottom of the flotation tank) would be subjected to sanding, as there is little or no mixing. If the area fills up with solids, a risk of this solid matter slumping in and at the same time blocking a tailings outlet and/or a recirculate outlet located at the settling zone.

By a blast tube is meant a dual high-shear device in which flotation gas is introduced into slurry infeed, thereby creating finer flotation gas bubbles that are able entrap also finer particles already during the bubble formation in the blast tube. In particular, a blast tube in a flotation cell of a flotation line according to the invention operates under pressure, and not vacuum is needed.

By flotation volume herein is meant the aggregate volume of all flotation cells within the flotation line employed for the flotation process. By stating that a certain percentage of the flotation volume comprises a mechanical agitator is therefore simply meant that a number of the flotation cells within the flotation line, depending of the aggregate volume and volume of the individual flotation cells, comprise a mechanical agitator.

By overflow herein is meant the part of the slurry collected into the launder of the flotation cell and thus leaving the flotation cell. Overflow may comprise froth, froth and slurry, or in certain cases, only or for the largest part slurry. In some embodiments, overflow may be an accept flow containing the valuable material particles collected from the slurry. In other embodiments, the overflow may be a reject flow. This is the case in when the flotation arrangement, plant and/or method is utilized in reverse flotation.

By underflow herein is meant the fraction or part of the slurry which is not floated into the surface of the slurry in the flotation process. In some embodiments the underflow may be a reject flow leaving a flotation cell via an outlet which typically is arranged in the lower part of the flotation cell. Eventually the underflow from the final flotation cell of a flotation line or a flotation arrangement may leave the entire arrangement as a tailings flow or final residue of a flotation plant. In some embodiments, the underflow may be an accept flow containing the valuable mineral particles. This is the case in when the flotation arrangement, plant and/or method is utilized in reverse flotation.

By reverse flotation herein is meant an inverse flotation process typically utilized in the recovery of iron. In that case, the flotation process is directed for collecting the non-valuable part of the slurry flow into the overflow. The overflow in reverse flotation process for iron contains typically silicates, while the valuable iron-containing mineral particles are collected in the underflow. Reverse flotation may also be used for industrial minerals, i.e. geological mineral mined for their commercial values which are not fuel, nor sources of metals, such as bentonite, silica, gypsum, and talc.

By downstream herein is meant the direction concurrent with the flow of slurry towards the tailings (forward current, denoted in the figures with arrows), and by upstream herein is meant the direction counter current with or against the flow of slurry towards the tailings.

By concentrate herein is meant the floated part or fraction of slurry of ore particles comprising a valuable mineral. In normal flotation, concentrate is the part of the slurry that is floated into the froth layer and thereby collected into the launders as overflow. A first concentration concentrate may comprise ore particles comprising one valuable mineral, where as a second concentration concentrate may comprise ore particles comprising another valuable mineral. Alternatively, the distinctive definitions first, second, may refer to two concentrations concentrates of ore particles comprising the same valuable mineral but two distinctly different particle size distributions.

By a rougher flotation, rougher part of the flotation line, rougher stage and/or rougher cells herein is meant the first flotation stage that produces a rougher concentrate. The objective is to remove a maximum amount of the valuable mineral at as coarse a particle size as practical. Complete liberation is not required for rougher flotation, only sufficient liberation to release enough gangue from the valuable mineral to get a high recovery. The primary objective of a rougher stage is to recover as much of the valuable minerals as possible, with less emphasis on the quality of the concentrate produced.

The rougher concentrate is normally subjected to further stages of cleaner flotation in a rougher cleaner flotation line to reject more of the undesirable minerals that have also reported to the froth, in a process known as cleaning. The product of cleaning is known as cleaner concentrate or final concentrate. It is possible to have a regrinding step prior to the cleaning process.

Rougher flotation is often followed by scavenger flotation that is applied to the rougher tailings. By a scavenger flotation, a scavenger part of the flotation line, scavenger stage and/or a scavenger cell is meant a flotation stage wherein the objective is to recover any of the valuable mineral material that was not recovered during the initial rougher stage. This might be achieved by changing the flotation conditions to make them more rigorous than the initial roughing, or, in some embodiments of the invention, by the introduction of microbubble into the slurry. The concentrate from a scavenger cell or stage could be returned to the rougher feed for re-floating or directed to a regrinding step and thereafter to a scavenger cleaner flotation line.

By cleaner flotation, a rougher/scavenger cleaner line, cleaner/cleaning stage and/or a cleaner cell is meant a flotation stage wherein the objective of cleaning is to produce as high a concentrate grade as possible.

By pre-treatment and/or post-treatment and/or further processing is meant for example comminution, grinding, separation, screening, classification, fractioning, conditioning or cleaning, all of which are conventional processes as known to a person skilled in the art. A further processing step may include also at least one of the following: a further flotation cell, which may be a conventional cleaner flotation cell, a recovery cell, a rougher cell, or a scavenger cell.

By slurry surface level herein is meant the height of the slurry surface within the flotation cell as measured from the bottom of the flotation cell to the launder lip of the flotation cell. In effect, the height of the slurry is equal to the height of a launder lip of a flotation cell as measured from the bottom of the flotation cell to the launder lip of the flotation cell. For example, any two subsequent flotation cells may be arranged in a stepwise fashion in a flotation line so that the slurry surface level of such flotation cells is different (i.e. the slurry surface level of the first of such flotation cells is higher than the slurry surface level of the second of such flotation cells). This difference in the slurry surface levels is defined herein as "step" between any two subsequent flotation cells. The step or the difference in slurry surface levels is a height difference allowing the flow of slurry be driven by gravity or gravitation force, by creating a hydraulic head be-tween the two subsequent flotation cells.

By a flotation line herein is meant an assembly or arrangement comprising a number of flotation units or flotation cells in which a flotation stage is performed, and which are arranged in fluid connection with each other for allowing either gravity-driven or pumped slurry flow between flotation cells, to form a flotation line. In a flotation line, a number of flotation cells are arranged in fluid connection with each other so that the underflow of each preceding flotation cell is directed to the following or subsequent flotation cell as a infeed until the last flotation cell of the flotation line, from which the underflow is directed out of the line as tailings or reject flow. It is also conceivable that a flotation line may comprise only one flotation stage performed either in one flotation cell or for example in two or more parallel flotation cells.

Slurry is fed through a feed inlet to the first flotation cell of the flotation line for initiating the flotation process. Flotation line may be a part of a larger treatment plant containing one or more flotation lines, and a number of other process stages for the liberation, cleaning and other treatment of a desired material. Therefore, a number of different pre-treatment and post-treatment devices or arrangements may be in operational connection with the components of the flotation line, as is known to the person skilled in the art.

By ultra-fine bubbles herein is meant flotation gas bubbles falling into a size range of 0.05 mm to 0.7 mm, introduced into the slurry in a blast tube. In contrast, "normal" flotation gas bubbles utilized in froth flotation display a size range of approximately 0.8 to 2 mm. Larger flotation gas bubbles may have a tendency to coalesce into even larger bubbles during their residence in the mixing zone where collisions between particles and flotation gas bubbles, as well as only between flotation gas bubbles take place. As ultra-fine bubbles are introduced into slurry infeed prior to its feeding into a flotation tank, such coalescence is not likely to happen with ultra-fine bubbles, and their size may remain smaller throughout their residence in the flotation cell, thereby affecting the ability of the ultra-fine bubbles to catch fine particles.

A blast tube, or its outlet nozzle may be a further configured to induce a supersonic shockwave into the slurry infeed as it exits the blast tube, the supersonic shockwave inducing formation of flotation gas bubble-particle agglomerates. A supersonic shockwave is created when the velocity of slurry infeed passing through the outlet nozzle exceeds the speed of sound, i.e. the flow of slurry infeed becomes choked when the ratio of the absolute pressure upstream the outlet nozzle to the absolute pressure downstream of the throttle of the outlet nozzle exceeds a critical value. When the pressure ratio is above the critical value, flow of slurry infeed downstream of the throttle part of the outlet nozzle becomes supersonic and a shock wave is formed. Small flotation gas bubbles in slurry infeed mixture are split into even smaller by being forced through the shock wave, and forced into contact with hydrophobic ore particles in slurry infeed, thus creating flotation gas bubble-ore particle agglomerates. The supersonic shockwave produced into the slurry infeed at the outlet nozzle carries into the slurry within the flotation tank immediately adjacent to an outlet nozzle, thereby promoting the formation of flotation gas bubbles also in the slurry outside the outlet nozzles. After exiting the outlet nozzle, fine ore particles may contact the small flotation gas bubbles a second time, as there are several of such blast tubes/outlet nozzles discharging into a common mixing area in which the probability of secondary contacts between bubbles and particles is increased by the intermixing flows of slurry exiting the blast tubes.

The blast tubes may also include impingers. An impinger deflects the flow of slurry infeed radially outwards to the flotation tank sidewall and upwards towards the flotation tank upper surface (i.e. to the froth layer) so the fine flotation gas bubble-ore particle agglomerates do not short circuit into the tailings. All of the slurry infeed from the blast tubes are forced to rise up towards the froth layer at the top region of the flotation tank before gravity has the chance to influence the particles not adhered to flotation gas bubbles, forcing them to descend and eventually report to tailings flow or underflow. Thereby the probability of valuable material containing particles short-circuiting may be diminished. Slurry is highly agitated by the energy of the deflected flow, and forms mixing vortexes in which the size of the bubbles may be further reduced by the shear forces acting upon them. The high-shear conditions favourably also induce high number of contacts between flotation gas bubbles and particles in the slurry within the flotation tank. As the flow of slurry is forced upwards towards the froth layer, turbulence reduces and the flow becomes relatively uniform, which may contribute to the stability of the already formed bubbles, and flotation gas bubble-particle agglomerates, especially those comprising coarser particles.

In an embodiment of the flotation line according to the invention, the flotation line further comprises a rougher part with a rougher flotation cell for the separation of slurry into underflow and overflow, the overflow arranged to flow directly into a cleaner flotation line, and the underflow from a last rougher flotation cell arranged to flow into the scavenger part as slurry infeed.

In a further embodiment of the flotation line, the rougher part comprises at least two flotation cells, or 2-7 flotation cells, or 2-5 flotation cells.

Having a sufficient number of rougher flotation cells allows the production of high grade for part of the concentrate, and at the same time, ensuring high recovery of the desired valuable mineral throughout the flotation line, thus avoiding having any of the valuable mineral ending up in the tailings flow.

In an embodiment of the flotation line, at least 60% of the flotation volume in the flotation line comprises a mechanical agitator comprising a system for introducing flotation gas into the flotation cell.

Flotation cells with mechanical agitation and relatively large volume are capable of handling higher slurry feed rates and a wider range of particle sizes, thus improving the overall efficiency of the flotation line, as well as decreasing the need of energy-intensive grinding, as the slurry need not have particularly uniform particle size distribution to ensure recovery of the valuable material.

In an embodiment of the flotation line, the scavenger part comprises a flotation cell with blast tubes.

In a further embodiment of the flotation line, the flotation cell with blast tubes is preceded by a scavenger flotation cell.

In a further embodiment of the flotation line, the flotation cell with blast tubes is preceded by a scavenger flotation cell comprising a mechanical agitator.

In a further embodiment of the flotation line, the flotation cell with blast tubes is preceded by a further flotation cell comprising blast tubes.

In a further embodiment of the flotation line, a flotation cell with blast tubes is the last flotation cell of the scavenger part.

In an embodiment of the flotation line, the scavenger cleaner part with a flotation cell comprising blast tubes.

In a further embodiment of the flotation line, the flotation cell with blast tubes is preceded by a scavenger cleaner flotation cell.

In a further embodiment of the flotation line, the flotation cell with blast tubes is preceded by a scavenger cleaner flotation cell comprising a mechanical agitator.

In a further embodiment of the flotation line, the scavenger cleaner flotation cell is preceded by a Jameson cell in which the size range of the flotation gas bubbles is 0.05 to 0.7 mm; or a further flotation cell with blast tubes, in which the size range of the flotation gas bubbles is 0.4 to 1.2 mm.

In a further embodiment of the flotation line, the scavenger cleaner flotation cell is preceded by a further flotation cell with blast tubes configured to restrict flow of slurry infeed from an outlet nozzle, to maintain slurry infeed under pressure in the blast tube, and to induce a supersonic shockwave into the slurry infeed as it exits the blast tube.

In a further embodiment of the flotation line, a flotation cell with blast tubes is the last flotation cell of the scavenger cleaner part.

In a further embodiment of the flotation line, the scavenger part comprises a flotation cell comprising blast tubes.

In a yet further embodiment of the flotation line, the flotation cell with blast tubes is preceded by a scavenger flotation cell.

In another embodiment of the flotation line, the flotation cell with blast tubes is preceded by a scavenger flotation cell comprising a mechanical agitator.

In another embodiment of the flotation line, the flotation cell with blast tubes is preceded by a further flotation cell comprising blast tubes.

In another embodiment of the flotation line, a flotation cell with blast tubes is the last flotation cell of the scavenger part.

In an embodiment of the flotation line, overflows of the flotation cells comprise a concentrate, and underflows of the flotation cells are arranged to flow into the tailings.

In an embodiment of the flotation line, underflow from a previous flotation cell is arranged to be led into the subsequent flotation cell by gravity.

By arranging the flow of slurry be driven by gravity, savings in energy consumption may be achieved as no additional pumping is required to drive the slurry downstream. This may be achieved for example by the flotation line being arranged in a stepwise fashion, so that at least some of the flotation cells (i.e. the bottoms of the flotation cells), either in the rougher part, and/or n the scavenger part, and/or in the scavenger cleaner part, are positioned at different levels: for example, the bottom of the first rougher flotation cell may be arranged higher than the bottom of the following rougher and/or scavenger flotation cell(s). In that way, the slurry surface level of at least some of the flotation cells following the first rougher flotation cells is lower, thus creating a step between any two subsequent flotation cells in direct fluid connection with each other. The thus-created step allows achieving a hydrostatic head or hydrostatic pressure differential (hydraulic gradient) between the two subsequent flotation cells, whereby the flow of slurry from one cell to the next may be realized by gravitational force, without any separate pumps. The hydraulic gradient forces the flow of slurry towards the tailings outlet or outlets of the flotation line. This may reduce the need for additional pumping. Further, pumping power requirement might be reduced as material flow is directed downstream gravitationally due to drop in slurry surface levels. This can apply even to embodiments in which the slurry surface levels of adjacent flotation cells in the flotation line are at one level. The decreased need of energy-intensive pumping will lead to savings in energy consumption, as well as simplified construction of the flotation operation, and to less need of space for the construction.

It is also conceivable to arrange the flotation line so that at least some, or all flotation cells (i.e. the bottoms of the flotation cells) are on same level. This may increase construction speed, simplify planning and construction and thus reduce costs. This so-called uniplanarity of flotation cells or the flotation line might offer advantages through reduction of investment costs, as setting up a plant requires less ground work and less space. This might be especially advantageous when the flotation cell size is increased. This again, might be desirable from the perspective of optimizing process performance while reducing capital costs for the investment.

By avoiding energy-intensive pumping in a flotation line, significant savings in energy may be achieved, while, at the same time, ensuring efficient recovery of valuable mineral material from ores of poor quality, i.e. comprising even very little valuable mineral to start with. It may be possible to produce some part of the concentration with high grade, but also, at the same time have a good overall recovery of the desired valuable mineral. Only insignificant amounts of the valuable mineral may end up in the tailing flow.

The invention at hand may also aim in part at improving the mineral recovery process while decreasing energy consumption of the process. This is made possible by utilizing the inherent flows of slurry of the process, i.e. by moving the slurry flow into retreatment in downstream flotation cells. By arranging the flotation process thus, it is possible to direct the flow of slurry by gravity. In some embodiments, the flow of slurry may also be directed by low-intensity pumping, or by a suitable combination of the two, that is, gravity and low-intensity pumping.

By low-intensity pumping herein is meant any type of pump producing a low pressure for driving a flow of slurry downstream. Typically, a low-head pump produces a maximum head of up to 1.0 meters, i.e. may be used to drive the flow of slurry between two adjoining flotation cells with less than 30 cm difference in slurry surface level. A low-head pump may typically have an impeller for creating an axial flow.

In an embodiment of the flotation line, the flotation line comprises at least three flotation cells, or 3-10 flotation cells, or 4-7 flotation cells.

In an embodiment of the flotation line, the scavenger part comprises at least two flotation cells, or 2-7 flotation cells, or 2-5 flotation cells.

In an embodiment of the flotation line, the scavenger cleaner part comprises at least two flotation cells, or 2-6 flotation cells, or 2-4 flotation cells.

Having a sufficient number of flotation cells allows the production of high grade for part of the concentrate, and at the same time, ensuring high recovery of the desired valuable mineral throughout the flotation line, thus avoiding having any of the valuable mineral ending up in the tailings flow. As much as possible of the ore particles comprising valuable mineral may be floated while still minimizing the required pumping energy to achieve this.

In an embodiment of the flotation line, the ratio of height of a flotation cell with blast tubes; the height measured as the distance from the bottom of a flotation tank of the flotation cell to a launder lip of the flotation tank, to diameter of the flotation cell with blast tubes; the diameter measured at a distance of an outlet nozzle of a blast tube from the bottom of the flotation tank, is 0.5 to 1.5. I.e. the flotation cell height to diameter ratio is 0.5 to 1.5.

In an embodiment of the flotation line, the volume of a flotation tank with blast tubes is at least 10 $m^3$.

By arranging a flotation tank to have a sufficient volume the flotation process may be better controlled. The ascent distance to the froth layer on the top part of the flotation tank does not become too large, which may help to ensure that the flotation gas bubble-ore particle agglomerates remain together until the froth layer and particle drop-back may be reduced. Further, a suitable bubble rise velocity may be reached to maintain a good concentrate quality. Utilizing flotation cells with a sufficient volumetric size of increases the probability of collisions between gas bubbles created into the flotation cells for example by means of a rotor, and the particles comprising valuable mineral, thus improving the recovery rate for the valuable mineral, as well as the overall efficiency of the flotation arrangement. Larger flotation cells have a higher selectivity as more collisions between the gas bubbles and the ore particles may take place due to the longer time the slurry stays in the flotation cell. Therefore most of the ore particles comprising valuable mineral may be floated. In addition, the backdrop of buoyant ore particles may be higher, which means that ore particles comprising very low amount of valuable mineral drop back into the bottom of the flotation cell. Thus the grade of overflow and/or concentrate from larger flotation cells may be higher. These kinds of flotation cells may ensure high grade. Further, the overall efficiency of the flotation cell and/or the entire flotation line may be improved. In addition, in case the first flotation cells in a flotation line have a relatively large volume, there may be no need for large subsequent flotation cells, but rather, the flotation cells downstream from the first flotation cell or cells may be smaller and therefore more efficient. In flotation processes of certain minerals, it may be easy to float a significant part of the ore particles comprising valuable mineral with high grade. In that case it may be possible to have flotation cells of smaller volume downstream in the flotation line and still achieve high recovery rate.

In an embodiment of the flotation line, a flotation cell with blast tubes comprises 2-40 blast tubes, preferably 4-24 blast tubes.

The exact number of blast tubes within a flotation cell may depend on the flotation tank size or volume, on the type of material to be collected and other process parameters. By arranging a sufficient number of blast tubes into a flotation cell, and by arranging them in a specific manner in relation to the flotation tank centre and perimeter and/or side wall, even distribution of ultra-fine bubbles may be ensured, as well as even mixing effect caused by the shear forces within tank secured. The number of blast tubes directly influences the amount of flotation gas that can be dispersed in the slurry. In conventional froth flotation, dispersing an increasing amount of flotation gas would lead to increased flotation gas bubble size. For example, in a Jameson cell, an air-to-bubble ratio of 0.50 to 0.60 is utilized. Increasing the average bubble size will affect the bubble surface area flux (Sb) detrimentally, which means that recovery may be decreased. In a flotation cell according to the invention, with pressurized blast tubes, significantly more flotation gas may be introduced into the process without increasing the bubble size or decreasing Sb, as the flotation gas bubbles created into the slurry infeed remain relatively small in comparison to the conventional processes. On the other hand, by keeping the number of blast tubes as small as possible, costs of refitting existing flotation cells, or capital expenditure of setting up such flotation cells may be kept in check without causing any loss of flotation performance of the flotation cells.

An embodiment of the use of the flotation line according to the invention is particularly intended for recovering mineral ore particles comprising nonpolar minerals such as graphite, sulfur, molybdenite, coal, and talc.

Treatment of slurries for the recovery of such industrial minerals as bentonite, silica, gypsum, or talc, may be improved by using reverse flotation. In recovering industrial minerals, the goal of flotation may be, for example, the removal of dark particles into the overflow reject, and recovery of white particles into the underflow accept. In that kind of process, some of the lighter, finer white particles may end up into the overflow. Those particles could be efficiently recovered by the invention according to the present disclosure. In reverse flotation, particles comprising undesirable material are removed from the slurry by arranging the gas bubbles to adhere to those particles and removing them from the flotation cell in the overflow, whereas the valuable material comprising particles are recovered in the underflow, thus inversing the conventional flotation flows of accept into overflow and reject into underflow. Typically in reverse flotation, the large mass pull of invaluable material may cause significant problems in controlling the flotation process.

An embodiment of the use of the flotation line according to the invention is particularly intended in recovering particles comprising polar minerals.

An embodiment of the use of the flotation line is particularly intended in recovering particles from minerals having a Mohs hardness of 2 to 3, such as galena, sulfide minerals, PGM minerals, and/or REO minerals.

A further embodiment of the use of the flotation line is particularly intended in recovering particles comprising Pt.

An embodiment of the use of the flotation line is particularly intended in recovering particles comprising Cu from minerals having a Mohs hardness from 3 to 4.

A further embodiment of the use of the flotation line is particularly intended in recovering particles comprising Cu from low grade ore.

Valuable mineral may be for example Cu, or Zn, or Fe, or pyrite, or metal sulfide such as gold sulfide. Mineral ore particles comprising other valuable mineral such as Pb, Pt, PGMs (platinum group metals Ru, Rh, Pd, Os, Ir, Pt), oxide mineral, industrial minerals such as Li (i.e. spodumene), petalite, and rare earth minerals may also be recovered, according to the different aspects of the present invention.

For example, in recovering copper from low grade ores obtained from poor deposits of mineral ore, the copper amounts may be as low as 0.1% by weight of the feed, i.e. infeed of slurry into the flotation line. The flotation line according to the invention may be very practical for recovering copper, as copper is a so-called easily floatable mineral. In the liberation of ore particles comprising copper, it may be possible to get a relatively high grade from the first flotation cells of the flotation line. Recovery may be further increased by a flotation cell according to the invention.

By using the flotation line according to the present invention, the recovery of such low amounts of valuable mineral, for example copper, may be efficiently increased, and even poor deposits cost-effectively utilized. As the known rich deposits have increasingly already been used, there is a tangible need for processing the less favourable deposits as well, which previously may have been left unmined due to lack of suitable technology and processes for recovery of the valuable material in very low amounts in the ore.

In an embodiment of the flotation plant, the plant comprises at least two, or at least three flotation lines according to the invention.

In an embodiment of the flotation plant, a flotation line is arranged to recover particles from minerals having a Mohs hardness of 2 to 3, such as galena, sulfide minerals, PGMs, and/or REO minerals.

In a further embodiment of the flotation plant, a flotation line is arranged to recover particles comprising Pt.

In an embodiment of the flotation plant, a flotation line is arranged to recover particles comprising Cu from minerals having a Mohs hardness from 3 to 4.

In a further embodiment of the flotation plant, a flotation line is arranged to recover particles comprising Cu from low grade ore.

BRIEF DESCRIPTION OF THE DRAWINGS

The accompanying drawings, which are included to provide a further understanding of the current disclosure and which constitute a part of this specification, illustrate embodiments of the disclosure and together with the description help to explain the principles of the current disclosure. In the drawings.

DETAILED DESCRIPTION

Reference will now be made in detail to the embodiments of the present disclosure, an example of which is illustrated in the accompanying drawings.

The description below discloses some embodiments in such a detail that a person skilled in the art is able to utilize the flotation cell, flotation line and its use based on the disclosure. Not all steps of the embodiments are discussed in detail, as many of the steps will be obvious for the person skilled in the art based on this disclosure.

For reasons of simplicity, item numbers will be maintained in the following exemplary embodiments in the case of repeating components.

Figure 1:
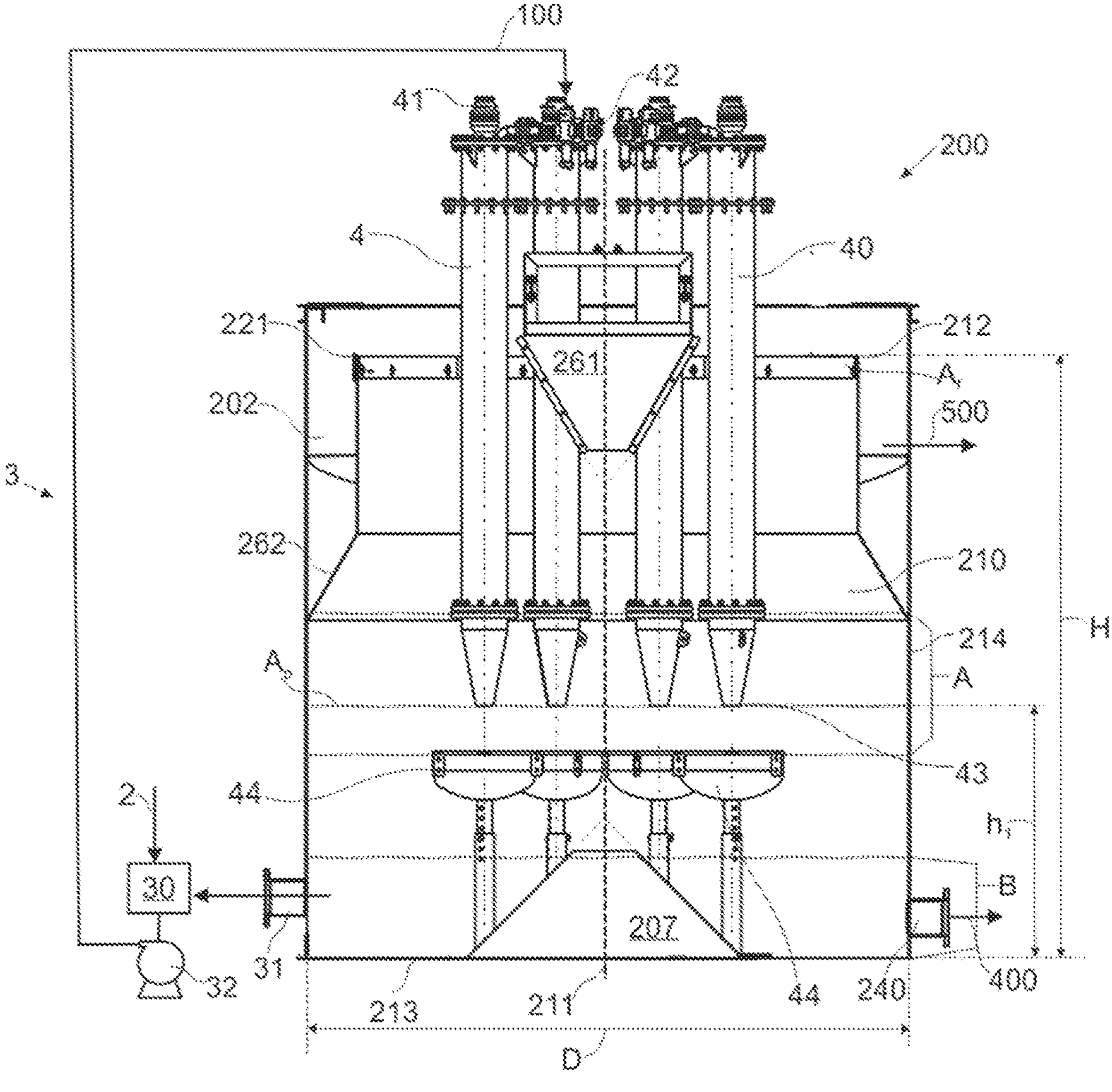
FIG. 1 is a vertical cross-section of a flotation cell with blast tubes.
Figure 2:
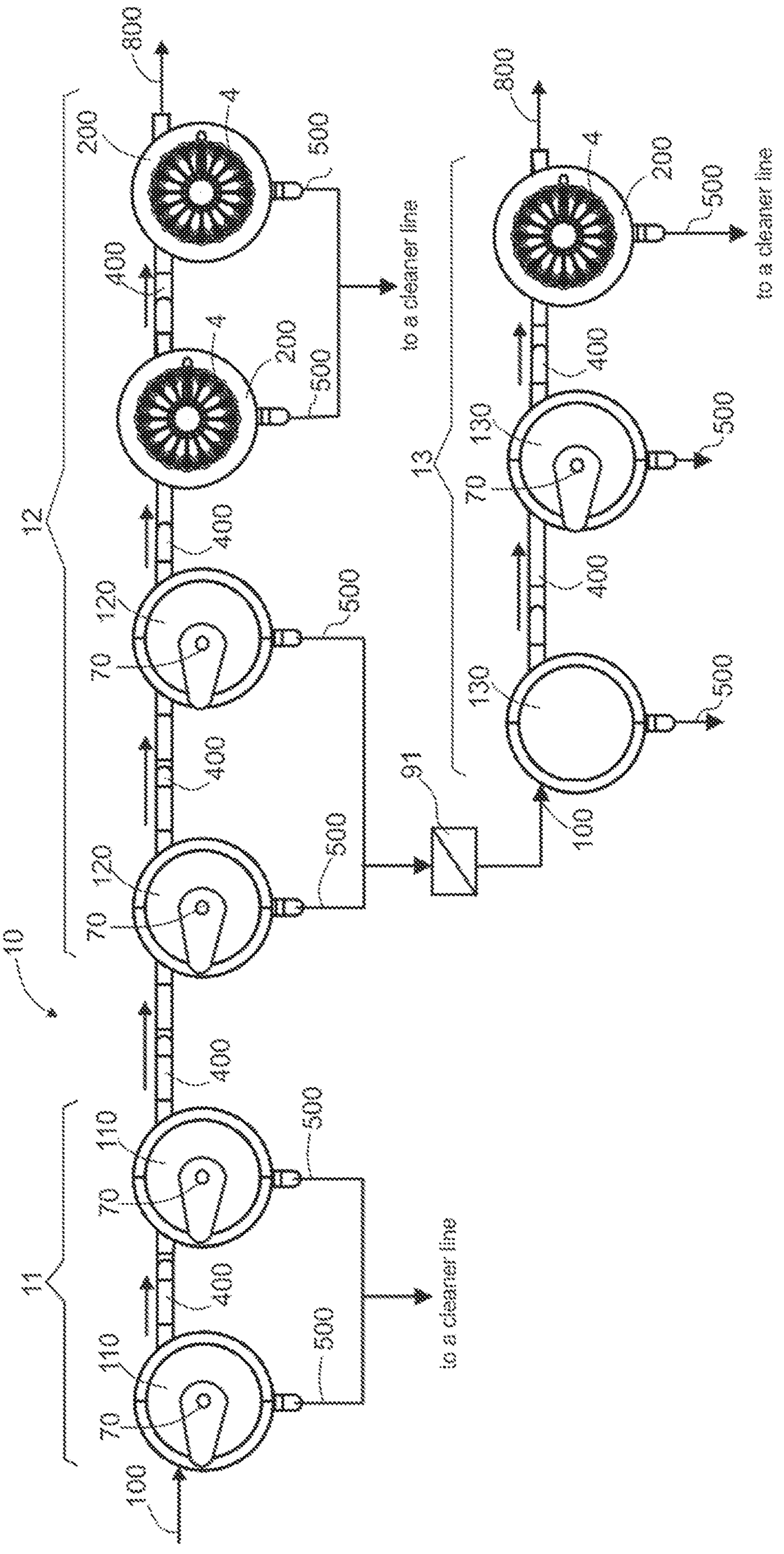
FIG. 2 is a schematic drawing of a flotation line according to an embodiment of the invention.
Figure 3:
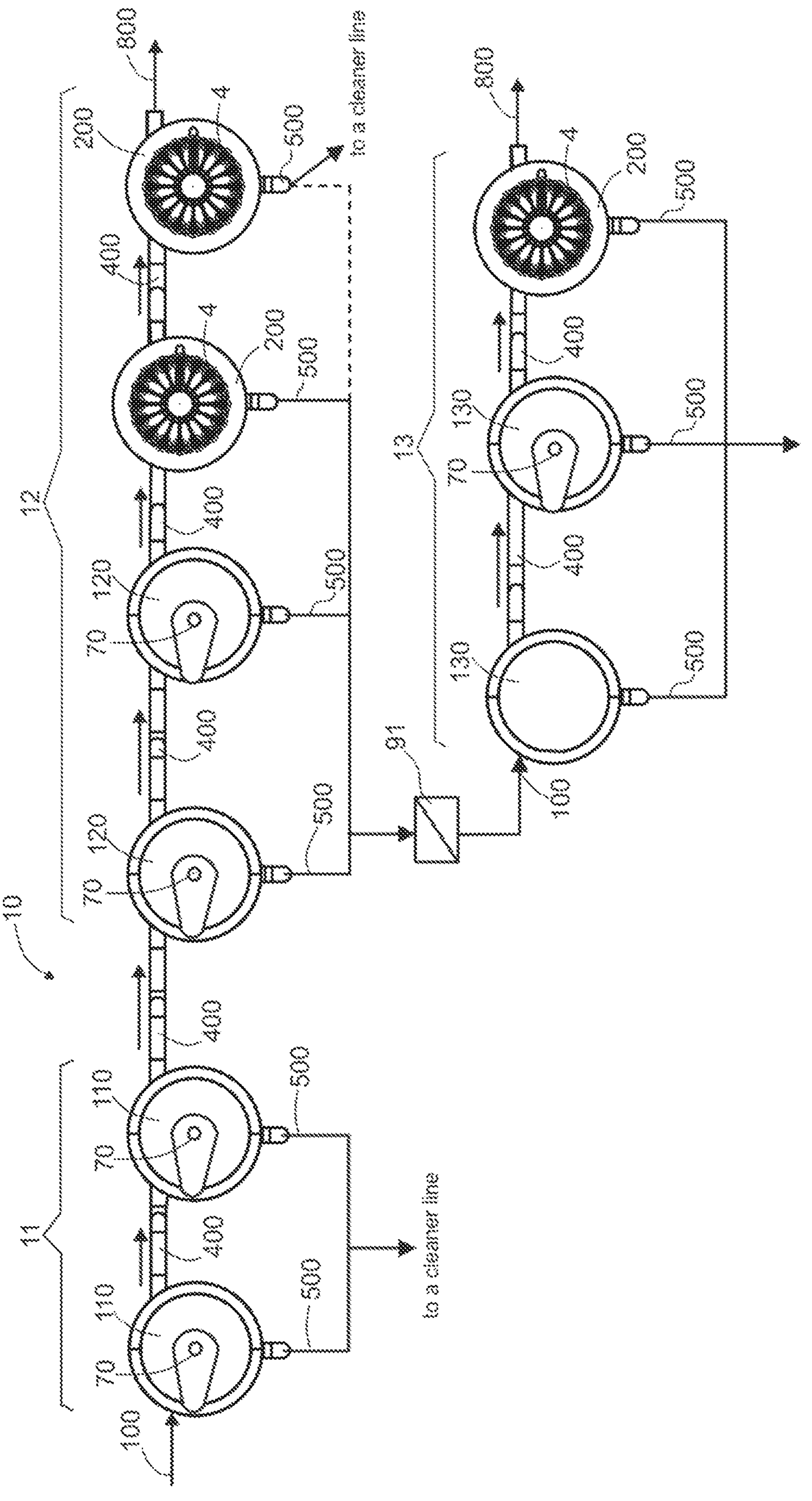
FIG. 3 is a schematic drawing of a flotation line according to a different embodiment of the invention, and FIG. 4 a schematic drawing of a flotation line according to yet another embodiment of the invention.
Figure 4:
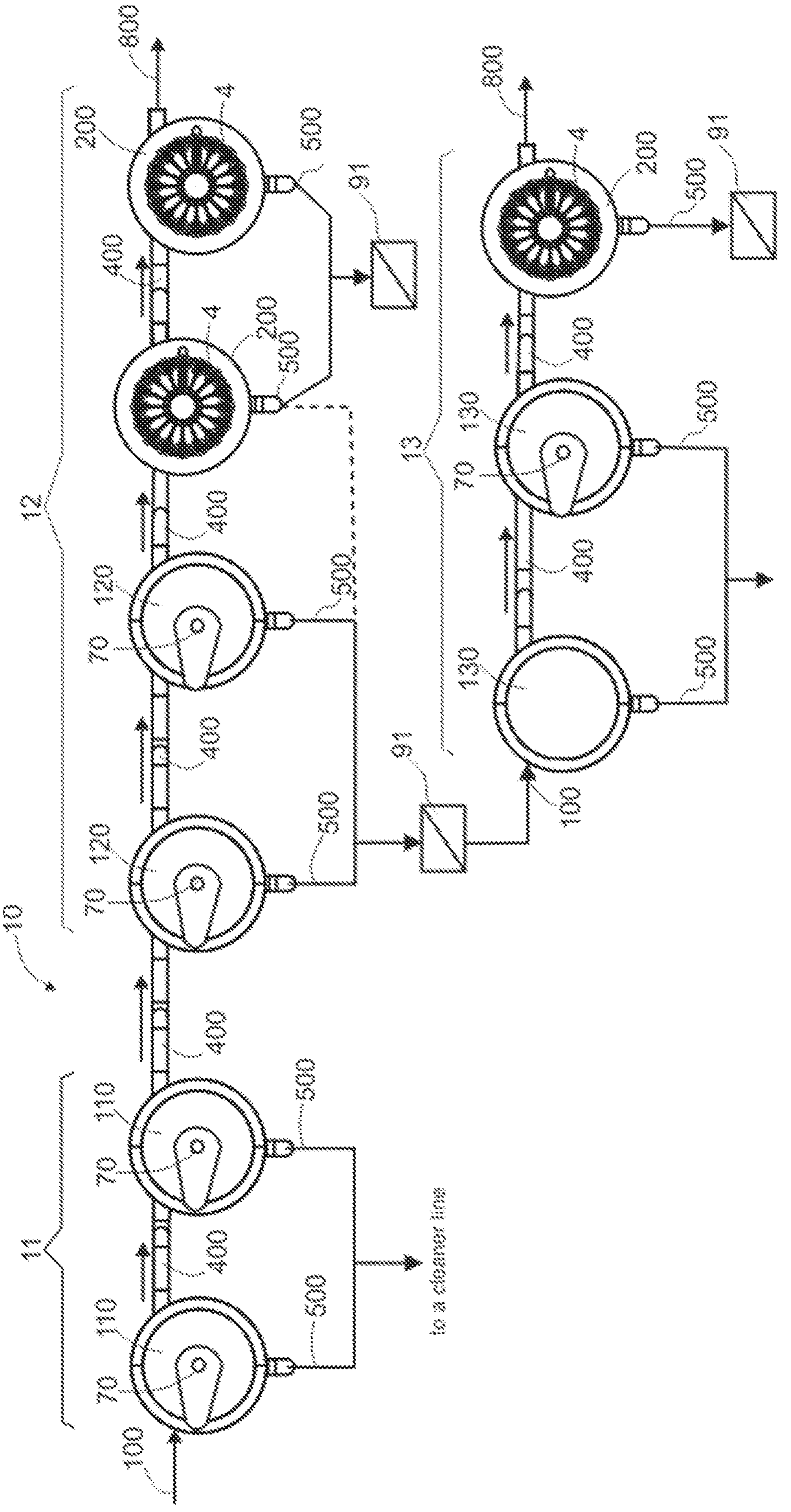

The enclosed FIG. 1 illustrates a flotation cell 200 with blast tubes 4 in some detail. The figure is not drawn to proportion, and many of the components of the flotation cell 200 with blast tubes 4 are omitted for clarity. FIGS. 2-4 illustrate in a schematic manner embodiments of a flotation line 10. The direction of flows of slurry is shown in the figures by arrows.

A flotation cell 200 with blast tubes 4, as well as a rougher flotation cell 110, a scavenger flotation cell 120, and a scavenger cleaner flotation cell 130, are intended for treating mineral ore particles suspended in slurry and for separating the slurry into an underflow 400 and an overflow 500, the overflow 500 comprising a concentrate of a desired mineral. The flotation cell 200 with blast tubes 4 comprises a flotation tank 210 that has a centre 211, a perimeter 212, a bottom 213 and a side wall 214. The flotation cell 200 further comprises a launder 202 and a launder lip 221 surrounding the perimeter 212 of the flotation tank 210. A rougher flotation cell 110, a scavenger flotation cell 120, and a scavenger cleaner flotation cell 130 may be of any suitable flotation cell type known in the art. They may for example, comprise a mechanical agitator 70 comprising a system for introducing flotation gas into the flotation cell. In an embodiment, a scavenger flotation cell 120, and a scavenger cleaner flotation cell 130 may comprise a Jameson cell, in which a size range of flotation gas bubbles is 0.4 to 1.2 mm.

In the accompanying figures, launder 202 is a perimeter launder. It is to be understood that a launder 202 may comprise, alternatively or additionally, a central launder arranged at the centre 211 of the flotation tank 210, as is known in the technical field. A launder lip of a central launder may face towards the perimeter 212 of the flotation tank 210, or towards the centre 211 of the flotation tank 210, or both. The overflow 500 is collected into the launder 202 or launders as it passes over a launder lip 221, from a froth layer formed in the upper part of the flotation tank 210. The froth layer comprises an open froth surface $A_f$ at the top of the flotation tank 210.

Underflow 400 is removed from or led out of the flotation tank via a tailings outlet. According to an embodiment, the tailings outlet 240 may be arranged at the side wall 214 of the flotation tank 210. The tailings outlet 240 may be arranged at the side wall 214 of the flotation tank 210 at a distance from the bottom 213 of the flotation tank 210. The distance is to be understood as the distance of the lowest point of the tailings outlet 240 or outlet opening in the side wall 214 of the flotation tank 210 from the tank bottom 213. The distance may be 1 to 15% of the height H of the flotation tank 210. For example, the distance may be 2%, or 5% or 7.5%, or 12% of the height H. Alternatively, the tailings outlet 240 may be arranged at the bottom 213 of the flotation tank 210. The tailings outlet 240 may be controlled by a dart valve, or by any other suitable manner known in the field, to control the flow rate of underflow from the flotation tank 210. Even if the tailings outlet 240 is controlled by internal or external structures such as up-flow or down-flow, respectively, dart boxes, the tailings outlet 240 is ideally located at the lower part of the flotation tank 210, i.e. near or adjacent to the bottom 213 of the flotation tank, or even at the bottom 213 of the flotation tank 210. More specifically, underflow 400 or tailings are removed from the lower part of the flotation tank 210, and at or near the side wall 214 of the flotation tank 210, at a settling zone B.

The flotation tank 210 may further comprise a froth crowder shaped to direct froth in an open froth surface $A_f$, towards the launder lip 221. The froth crowder may be a central froth crowder 261, or an internal perimeter froth crowder 262 arranged within the flotation tank 210 at a desired depth, at the side wall 214 of the flotation tank 210.

A central froth crowder 261 is arranged concentric to the centre 211 of the flotation tank 210. The central froth crowder 61 may have a shape of a cone or a truncated cone. The central froth crowder 261 may have a shape of a pyramid or a truncated pyramid. In other words, a vertical cross-section of a central froth crowder 261 may be an inverted triangle with a vertex pointing towards the bottom 213 of the flotation tank. In case the central froth crowder 261 is has a truncated structure or shape, the vertex is only functional, i.e. it is to be visualised as the lowest point of the structure or shape as continued to a complete untruncated form, whereby a included angle may be identified irrespective of the actual shape or form of the central froth crowder. The included angle may be 20 to 80°. For example, the included angle may be 22°, or 37.5° or 45°, or 55°, or 63.75°, or 74°. In an embodiment, the central froth crowder 261 is arranged to block 25 to 40% of the open froth surface $A_f$.

Alternatively or additionally to the central froth crowder 261, the flotation tank may comprise an internal perimeter crowder 262, arranged in the side wall 214 of the flotation tank 210 so that a lowest point of the internal perimeter crowder is located at a distance from the bottom 213 of the flotation tank 10. The distance may be ½ to ⅔ of the height H of the flotation cell 200. The internal perimeter crowder 262 may be formed to comprise a diagonal intake starting from the lowest point, and angled towards the centre 211 of the flotation tank 210, and extending between a first part of the side wall 214 of the flotation tank 210 and a second part of the side wall 214 so that an angle of inclination of the diagonal intake in relation to the first part of the side wall 214 is 20 to 80°. The angle of inclination may be for example 22°, or 37.5° or 45°, or 55°, or 63.75°, or 74°. The internal perimeter crowder 262 may be arranged to block ⅕ to ¼ of a pulp area $A_p$, which is measured at a distance $h_1$ of an outlet nozzle 43 of a blast tube 4 from the bottom 213 of the flotation tank 210, at a mixing area A. The mixing area A, i.e. the part or zone of the flotation tank in vertical direction where the slurry is agitated or otherwise induced to mix the ore particles suspended in the slurry with the flotation gas bubbles, is formed roughly at a vertical section of the flotation tank 210 around the lower parts of the blast tubes 4 and the impingers 44.

Additionally or alternatively, the flotation tank 210 may further comprise a bottom structure 207, arranged on the bottom 213 of the flotation tank 210, and having a shape that allows particles suspended in slurry to be mixed in a mixing zone A created over the bottom structure 207, and to settle down in a settling zone B surrounding the bottom structure 207.

The shape of the bottom structure 207 may be defined as follows: the vertical cross-section of the bottom structure 207 may be understood to display a form of a functional triangle that comprises a first (top) vertex, pointing away from the bottom 213 of the flotation tank 210; a second vertex; and a third vertex, the two latter disposed at the bottom 213 of the flotation tank 210. A first side is formed between the first vertex and the second vertex. A second side is formed between the first vertex and the third vertex. A base is formed between the second vertex and the third vertex, the base being thus parallel to and on the bottom 213 of the flotation tank 210. A central axis of the functional triangle is substantially concentric with the centre 211 of the flotation tank 210. “Substantially” in this context is to be understood so that during manufacturing and/or installation of the bottom structure 207, it is possible that slight deviations from the centre 211 of the flotation tank 210 may naturally occur. The intention is, nevertheless, that the two axes, central axis of the functional triangle (which is also the central axis of the bottom structure 207) and the centre of the flotation tank 210 are coaxial.

A base angle between the first side and the base (and/or between the second side and the base), in relation to the bottom 213 of the flotation tank 210 is 20 to 60°. For example, the angle may be 22°, or 27.5° or 35°, or 45°, or 53.75°. Further, an included angle between the first side and the second side is 20 to 100°. Preferably, the included angle is 20 to 80°. For example, the included angle may be 22°, or 33.5°, or 45°, or 57.75°, or 64°, or 85.5°. The functional triangle may therefore be an isosceles triangle or an equilateral triangle.

The functional triangle is in essence a form which may be identified though the abovementioned features, regardless of the actual form of the bottom structure 207, which may be, depending on the cross-section and other structural details of the flotation tank 210, for example a cone, a truncated cone, a pyramid, or a truncated pyramid. A cone or a truncated cone may be suitable from for a flotation tank with a circular cross-section. A pyramid or a truncated pyramid may be a suitable form for a flotation tank 210 with a rectangular cross-section.

The bottom structure 207 comprises a base, corresponding to the base of the functional triangle (i.e. the base c of the functional triangle defines the base of the bottom structure 207), and arranged on the bottom 213 of the flotation tank 210. Further, the bottom structure comprises a mantle. The mantle is defined at least by the first vertex, the second vertex and the third vertex of the functional triangle. Therefore, irrespective of the actual form of the bottom structure 207, the functional triangle defines the extreme physical dimensions of the bottom structure 207. For example, in case the bottom structure 207 has an irregular form yet being rotationally symmetrical, it would fit into the functional triangle in its entirety. In an embodiment, the mantle is at least partly defined by the first side and the second side of the functional triangle. An example of such an embodiment is a bottom structure 207 having the form of a truncated cone. In an embodiment, the mantle is defined essentially entirely by the first side and the second side of the functional triangle, i.e. the bottom structure 207 has the form of a cone.

The bottom structure 207 has a height, measured from the topmost part of the bottom structure 207 to the bottom 213 of the flotation tank 210. In case the form of the bottom structure is a cone or a pyramid, the topmost part is also the first vertex of the functional triangle. In case the bottom structure 207 has some sort of truncated form, the height is measured from the level top of the truncated form to the bottom 213 of the flotation tank 210. The height is greater than ⅕ and less than ¾ of the height H of the flotation cell 200. Further, a diameter of the base of the bottom structure 207 may be ¼ to ¾ of a diameter D of the flotation cell 200. In case a flotation tank 210 and/or the bottom structure 207 has a non-circular cross-section, the diameters are measured as the maximal diagonals of the respective parts (bottom structure 207 base and tank bottom 213). In an embodiment, the surface area of a base of the bottom structure 207 is less than 80% of the surface area of the bottom 213 of the flotation tank 210. The surface area of the base may be 25 to 80% of the surface area of the bottom 213 of the flotation tank 210.

Further, the volume of the flotation tank 210 taken by the bottom structure 207 may be 30 to 70% of the volume of the flotation tank 210 taken by the mixing zone A.

The bottom structure 207 may additionally comprise any suitable support structures and/or connecting structures for installing the bottom structure 207 into the flotation tank 210, on the bottom 213 of the flotation tank 210. The bottom structure 207 may be made of any suitable material such as metal, for example stainless steel.

The flotation cell 200 with blast tubes 4 has a height H, measured as the distance from the bottom 213 of the flotation tank 210 to the launder lip 221. At the perimeter 212 of the flotation tank 210, the height H is at most 20% lower than the height H at the centre 211 of the flotation tank 210. In other words, the flotation tank 10 may have different vertical cross-sections—for example, the side wall 14 of the flotation tank 10 may include at its lower part a section that is inclined towards the centre 11 of the flotation tank 10.

Further, the flotation cell 200 with blast tubes 4 has a diameter D, measured at a distance $h_1$ of an outlet nozzle 43 of a blast tube 4 from the bottom 213 of the flotation tank 210. In an embodiment, the height H to diameter D ratio H/D of the flotation cell 200 with blast tubes 4 is 0.5 to 1.5.

The flotation cell 200 with blast tubes 4 may have a volume of at least 10 $m^3$. The flotation cell 200 with blast tubes 4 may have a volume ranging from 20 to 1000 $m^3$. For example, the volume of the flotation cell 200 with blast tubes 4 may be 100 $m^3$, or 200 $m^3$, or 450 $m^3$, or 630 $m^3$.

The flotation cell 200 with blast tubes 4 may comprise 2-40 blast tubes 4, or 4-24 blast tubes 4 for introducing slurry infeed 100 into the flotation cell 200 or into the flotation tank 210. In an embodiment, there are 16 blast tubes 4. In another embodiment, there are 24 blast tubes 4. In yet another embodiment, there are 8 blast tubes 4. The exact number of blast tubes 4 may be chosen according to the specific operation, for example the type of slurry being treated within the flotation cell 200, the volumetric feed flow rate to the flotation cell 200, the mass throughput feed to the flotation cell 200, or the volume or dimensions of the flotation cell 200. In order to properly disperse flotation gas within the flotation tank 210, 4 to 6 blast tubes 4 may be employed.

A blast tube 4 is configured to restrict flow of slurry infeed from an outlet nozzle 43, and to maintain slurry infeed under pressure in the blast tube 4. A blast tube 4 comprises an inlet nozzle 41 for feeding slurry infeed 100 into the blast tube 4; an inlet 42 for pressurized air or other gas, so that the slurry infeed 100 may be subjected to pressurized air or other gas as it is discharged from the inlet nozzle 41; an elongated chamber 40 arranged to receive under pressure the slurry infeed 100; and the outlet nozzle 43. The outlet nozzle 43 may further be configured to produce a supersonic shockwave into the slurry infeed, the supersonic shockwave inducing formation of flotation gas bubble-particle agglomerates. For example, and to the outlet nozzle 43 may induce a supersonic shockwave into the slurry infeed 100 as it exits the blast tube 40. In addition, the supersonic shockwave may extend to the slurry adjacent or surrounding the outlet nozzle so that even outside the blast tube, the creation of small size flotation gas bubble-particle agglomerates is thus possible.

Flotation gas is entrained through a turbulent mixing action brought about by the jet, and is dispersed into small bubbles in the slurry infeed 100 as it travels downwards through the elongated chamber 40 to an outlet nozzle 43 configured to restrict the flow of slurry infeed 100 from the outlet nozzle 43, and further configured to maintain slurry infeed 100 under pressure in the elongated chamber 40.

For restricting the flow, an outlet nozzle 43 may comprise a throttle such as a throat-like restricting structure. From the outlet nozzle 43, more specifically from the throttle, slurry infeed 100 issues under pressure into the flotation cell 200. As the slurry infeed 100 passes through the outlet nozzle 43, or through the throttle of the outlet nozzle 43, flotation gas bubbles are reduced in size by the pressure changes, and by the high-shear environment downstream of the outlet nozzle 43. The velocity of the gas-liquid mixture in outlet nozzle 43, or in the throttle, may exceed the speed of sound when the flow of infeed slurry 100 becomes a choked flow and flow downstream of the throttle becomes supersonic, and a shockwave forms in the diverging section of the outlet nozzle 43. In other words, the outlet nozzle 43 may be configured to induce a supersonic shockwave into slurry infeed 100. The flow of slurry infeed 100 becomes choked when the ratio of the absolute pressure upstream the outlet nozzle 43 to the absolute pressure downstream of a restricting structure of the outlet nozzle 43 exceeds a critical value. When the pressure ratio is above the critical value, flow of slurry infeed 100 downstream of the restricting structure of the outlet nozzle 43 becomes supersonic and a shockwave is formed. Small flotation gas bubbles in slurry infeed 100 mixture are split into even smaller by being forced through the shockwave, and forced into contact with hydrophobic ore particles in slurry infeed 100, thus creating flotation gas bubble-ore particle agglomerates.

An outlet nozzle 43 may be disposed inside the flotation tank 210 at a desired depth. An outlet nozzle 43 may be positioned at a vertical distance from the launder lip 221, the distance being at least 1.5 m. In other words, the length of the portion of a blast tube 4 disposed inside the flotation tank 210 below the launder lip 221 level is at least 1.5 m. In an embodiment, the distance of the outlet nozzle 43 from the launder lip 221 is at least 1.7 m, and the distance $h_1$ of the outlet nozzle 43 from the bottom 213 of the flotation tank 210 is at least 0.4 m. For example, the distance of the outlet nozzle 43 from the launder lip 221 may be 1.55 m, or 1.75 m, or 1.8 m, or 2.2 m, or 2.45 m, or 5.25 m; and the distance $h_1$, irrespective of the distance of the outlet nozzle 43 from the launder lip 221, may be 0.45 m, 0.55 m, 0.68 m, 0.9 m, or 1.2 m. Further, the ratio of the distance of the outlet nozzle 43 from the launder lip 221 to the height H of the flotation cell 210 may be 0.9 or lower. The depth at which the blast tubes 4 are disposed inside the flotation tank 210 may depend on a number of factors, for example on the characteristics of the slurry and/or valuable mineral to be treated in the flotation cell 200, or on the configuration of a flotation line 1 in which the flotation cell 200 is arranged. The ratio of a distance $h_1$ of an outlet nozzle 43 from the bottom 213 of the flotation tank 210 to height H of the flotation tank 210, $h_1/H$ may be 0.1 to 0.75.

A diameter of an outlet nozzle 43 may be 10 to 30% of the diameter of an elongated chamber 40 of a blast tube 4. The diameter of an outlet nozzle 43 may be 40 to 100 mm. For example, the diameter of an outlet nozzle 43 may be 55 mm, or 62 mm, or 70 mm.

By arranging an outlet nozzle to have a certain diameter, the velocity of the slurry infeed may be maintained at a level favourable for the creation of small size flotation gas bubbles, and for the probability of these bubbles to contact the ore particles in the slurry. Especially, to maintain a shockwave after the outlet nozzle, a slurry velocity of 10 m/s or higher needs to be maintained. By designing the outlet nozzle in relation to the blast tube size, the effect of slurry infeed flow rate in different types of flotation cells may be accounted for.

A blast tube 4 may further comprise an impinger 44 configured to contact a flow of slurry infeed 100 from the outlet nozzle 43 and to direct the flow of slurry infeed 100 radially outwards and upwards of the impinger 44. Slurry infeed 100 exiting from the outlet nozzle 43 is therefore directed to contact the impinger 44. A distance from a bottom of the impinger 44 to the outlet nozzle 43 may be 2 to 20 times the diameter of the outlet nozzle 43. For example, the distance from the bottom of the impinger 44 to the outlet nozzle 43 may be 5 times, 7 times, or 12 times, or 15 times the diameter of the outlet nozzle 43. The ratio of the distance from the bottom of the impinger 44 to the outlet nozzle 43, to the distance $h_1$ of an outlet nozzle 43 from the bottom 13 of the flotation tank 10, may be lower than 1.0. Further, a distance of the bottom of the impinger 44 from the bottom 213 of the flotation tank 210 may be at least 0.3 m. For example the distance of the bottom of the impinger 44 from the bottom 213 of the flotation tank 210 may be 0.4 m, or 0.55 m, or 0.75 m, or 1.0 m. The impinger 44 may comprise an impingement surface intended for contacting the flow of slurry infeed 100 exiting the outlet nozzle 43. The impingement surface may be made of wear-resistant material to reduce the need for replacements or maintenance.

The slurry, which in essence is a three-phase gas-liquid-solid mixture, rising out of the impinger 44 enters the upper part of the flotation tank 210, and the flotation gas bubbles rise upwards and separate from the liquid to form a froth layer. The froth rises upwards and discharges over the launder lip 221 into the launder 202 and out of the flotation cell 1 as overflow 500. The tailings or underflow 400, from which the desired material has substantially been removed, pass out from the flotation tank 210 through an outlet arranged at or near the bottom 213 of the flotation tank 210.

Some of the coarse hydrophobic particles that are carried into the froth may subsequently disengage from flotation gas bubbles and drop back into the flotation tank 210, as a result of bubble coalescence in the froth. However, the majority of such particles fall back into the flotation tank 210 in such a way and position that they may be captured by bubbles newly entering the flotation tank 210 from the blast tubes 4, and carried once more into the froth layer.

The blast tubes 4 may be arranged concentric to the perimeter 212 of the flotation tank 210 at a distance from the centre 211 of the flotation tank 210, the distance being preferably equal for each blast tube 4. This may be the case when the flotation tank 210 is circular in cross-section. The blast tubes 4 may be further arranged so that each blast tube 4 is located at a distance of an outlet nozzle 43 from the centre 211 of the flotation tank 210, the distance being preferably equal for each blast tube 4. For example, the distance of an outlet nozzle 43 from the centre 211 of the flotation tank 210 may be 10 to 40% of the diameter D of the flotation tank 210. According to different embodiments of the flotation cell 200, the distance of an outlet nozzle 43 from the centre 211 of the flotation tank 210 may be 12.5%, or 15%, or 25% or 32.5% of the diameter D of the flotation tank 210.

Alternatively, the blast tubes 4 may be arranged parallel to the side wall 214 of the flotation tank 210, at a distance from the side wall 14. This may be the case when the flotation tank 210 is rectangular in cross-section. Additionally, the parallel arranged blast tubes 4 may be further arranged at a straight line within the flotation tank 210. The distance of the outlet nozzle 43 of a blast tube 4 from the side wall 214 of the flotation tank 210 may be 10 to 40% of the diameter D of the flotation tank 210. In an embodiment, the distance of the outlet nozzle 43 of a blast tube 4 from the side wall 214 of the flotation tank 210 is 25% of the diameter D of the flotation tank 210. According to different embodiments of the flotation cell 10, the distance of the outlet nozzle 43 of a blast tube 4 from the side wall 214 of the flotation tank 210 may be 12.5%, or 15%, or 27% or 32.5% of the diameter D of the flotation tank 210. Additionally, the parallel arranged blast tubes 4 may be further arranged at a straight line within the flotation tank 210.

Further, in all the above mentioned embodiments, the blast tubes 4 may be arranged at equal distance from each other so that a distance between any two adjacent outlet nozzle 43 is the same.

A slurry fraction 300 may be taken out from the flotation tank 210 via an outlet 31 arranged at the side wall 214 of the flotation tank 210. This slurry fraction 300 is recirculated into blast tubes 4 as infeed slurry. In an embodiment the slurry infeed 100 comprises 40% or less of slurry fraction 300. In an embodiment, the slurry infeed 100 comprises 50% or less slurry fraction 300. For example, the slurry infeed may comprise 5%, or 12.5%, or 20%, or 30%, or 37.5%, or 45% of the slurry fraction 300. Alternatively, the slurry infeed 100 may comprise 0% of slurry fraction 300, i.e. no recirculation of slurry taken from the flotation tank 210 back to the flotation cell 200 takes place, but the slurry infeed 100 comprises 100% of fresh slurry 200, for example from a previous flotation cell 110, 120, 130, 200 (that is, underflow 400 from a previous flotation cell), or from a previous process step.

The slurry fraction 300 may be recirculated to all of the blast tubes 4 of the flotation tank 210, or, alternatively, to some of the blast tubes 4, while other blast tubes 4 receive fresh slurry 200, comprising either the underflow 400 of a previous flotation cell 110, 120, 130, 200, or a slurry flow from some preceding process step, depending on the location of the flotation cell 200 within a flotation line 8. The outlet 31 may be arranged at a distance from the bottom 213 of the flotation tank 210. The distance of the outlet 31 from the bottom 213 of the flotation tank 210 is to be understood as the distance of the lowest point of the outlet or outlet opening in the side wall 214 of the flotation tank 210 from the tank bottom 213. The distance of the outlet 31 from the bottom 213 of the flotation tank 210 is 0 to 50% of the height H of the flotation cell 200. The outlet 31 may advantageously be positioned at a settling zone where the particles suspended in slurry and not captured by the flotation gas bubbles and/or the upwards flow of slurry descend towards the bottom 213 of the flotation tank 210. In an embodiment, the outlet 31 is arranged at the lower part of the flotation tank 210. For example, the distance of the outlet 31 from the bottom 213 of the flotation tank 210 may be 2%, or 8%, or 12.5%, or 17, or 25% of the height H of the flotation cell 200. Even if the outlet 31 is controlled by internal or external structures such as up-flow or down-flow dart boxes, respectively, the outlet 31 is ideally located at the lower part of the flotation tank 210, i.e. near or adjacent to the bottom 213 of the flotation tank. More specifically, slurry fraction 300 is removed from the lower part of the flotation tank 210.

The flotation cell 200 may also comprise a conditioning circuit 3. The conditioning circuit 3 may comprise a pump tank 30, or other such additional vessel, in fluid communication with the flotation tank 210. In the pump tank 30 infeed of fresh slurry 2 and a slurry fraction 300 taken from the flotation tank 210 via an outlet 31 are arranged to be combined into slurry infeed 100, which is then led into blast tubes 4 of the flotation tank 210. The fresh slurry 2 may be for example underflow 400 from a preceding flotation cell 110, 120, 130, 200, or in case the flotation cell 200 is the first flotation cell of a flotation line 1, an infeed of slurry coming from a grinding unit/step or a classification unit/step. It is also possible that slurry fraction 300 and fresh slurry 2 are distributed into the blast tubes 4 without being first combined in a pump tank 30.

The combined slurry may be recirculated to all of the blast tubes 4 of the flotation tank 210, or, alternatively, to some of the blast tubes 4, while other blast tubes 4 receive fresh slurry 200, comprising either the underflow 400 of a previous flotation cell 110, 120, 130, 200, or a slurry flow from some preceding process step, depending on the location of the flotation cell 200 within a flotation line 1.

The outlet 31 may be arranged at the side wall 214 of the flotation tank 210, at a distance from the bottom 213 of the flotation tank 210. The distance of the outlet 31 from the bottom 213 of the flotation tank 210 may be 0 to 50% of the height H of the flotation cell 200 with blast tubes 4. For example, the distance of the outlet 31 from the bottom 213 of the flotation tank 210 may be 2%, or 8%, or 12.5%, or 20%, or 33% of the height H of the flotation cell 200.

Additionally, the conditioning circuit may comprise a pump 32 arranged to intake the slurry fraction 300 from the flotation tank 10, and to forward slurry infeed 100 from the pump tank 30 to the blast tubes 4. The slurry fraction 300 may comprise low settling velocity particles such as fine, slow-floating particles. The slurry fraction may be taken from or near the bottom of the flotation tank 210. Additionally or alternatively, the conditioning circuit 3 may further comprise a distribution unit (not shown in FIG. 1), arranged to distribute slurry infeed 100 into the blast tubes 4. The pump 32 may also be used to forward the slurry infeed 100 into the blast tubes 4. In order to distribute the slurry infeed 100 evenly into the blast tubes 4, a distribution unit may be utilized. The distribution unit may, for example, comprise a feed pipe inside the flotation tank 210, configured to distribute slurry fraction 300 directly into the blast tubes 4. For example, the distribution unit may comprise conduits arranged outside the flotation tank 210, leading to a separate feed distributor configured to distribute slurry fraction 300, or a combination of slurry fraction 300 and fresh slurry 200 into the blast tubes 4.

The flotation line 10 for treating mineral ore particles suspended in slurry comprises a scavenger part 12 with one or more scavenger flotation cells 120 for the separation of slurry into underflow 400 and overflow 500. The scavenger part 12 may comprise at least two scavenger flotation cells 120. The scavenger part 12 may comprise 2 to 7 scavenger flotation cells 120. The scavenger part 12 may comprise 2 to 5 scavenger flotation cells 120. The scavenger part 12 comprises also one or more flotation cells 200 with blast tubes 4. Alternatively, the scavenger part 12 may be followed by one or more flotation cell 200 with blast tubes 4.

A flotation cell 200 with blast tubes 4 is configured to receive underflow 400 from a preceding scavenger flotation cell 120 as slurry infeed 100, or as part of a slurry infeed 100, to be combined with the slurry fraction 300 from the flotation cell 200 with blast tubes 4 prior to feeding it into a flotation cell 200 with blast tubes 4 as infeed slurry 100.

In the scavenger part 12, the flotation cell 200 with blast tubes 4 may be preceded by one or more scavenger flotation cell 120. Alternatively or additionally, the flotation cell 200 with blast tubes 4 may be preceded by a scavenger flotation cell 120 comprising a mechanical agitator 70. Further, alternatively or additionally, the flotation cell 200 with blast tubes 4 may be preceded by a further flotation cell 200 with blast tubes 4. According to an embodiment, the flotation cell 200 with blast tubes 4, or the flotation cells 200 with blast tubes 4, is/are the last flotation cell/s of the scavenger part 12.

The flotation line 10 further comprises a scavenger cleaner part 13 with one or more scavenger cleaner flotation cells 130 for the separation of slurry into underflow 400 and overflow 500. The scavenger cleaner part 13 may comprise at least two scavenger cleaner flotation cells 130. The scavenger cleaner part 13 may comprise 2 to 6 scavenger cleaner flotation cells 130. The scavenger cleaner part 13 may comprise 2 to 5 scavenger cleaner flotation cells 130. The scavenger cleaner part 13 comprises also one or more flotation cells 200 with blast tubes 4. Alternatively, the scavenger cleaner part 13 may be followed by one or more flotation cell 200 with blast tubes 4.

A flotation cell 200 with blast tubes 4 is configured to receive underflow 400 from a preceding scavenger cleaner flotation cell 130 as slurry infeed 100, or as part of a slurry infeed 100, to be combined with the slurry fraction 300 from the flotation cell 200 with blast tubes 4 prior to feeding it into a flotation cell 200 with blast tubes 4 as infeed slurry 100.

In the scavenger cleaner part 13, the flotation cell 200 with blast tubes 4 may be preceded by one or more scavenger cleaner flotation cells 130. Alternatively or additionally, the flotation cell 200 with blast tubes 4 may be preceded by a scavenger cleaner flotation cell 130 comprising a mechanical agitator 70. Further, alternatively or additionally, the flotation cell 200 with blast tubes 4 may be preceded by a further flotation cell 200 with blast tubes 4. In an embodiment, a scavenger cleaner flotation cell 130 is preceded by a Jameson cell. In the Jameson cell, the flotation gas bubbles display a size range of 0.4 to 1.2 mm. In an embodiment, a scavenger cleaner flotation cell 130 is preceded by further flotation cell 200 with blast tubes 4. In that flotation cell, the flotation gas bubbles display a size range of 0.05 to 0.7 mm. In a yet another embodiment, the scavenger cleaner flotation cell 130 may be preceded by a further flotation cell with blast tubes 4, configured to restrict flow of slurry infeed 100 from an outlet nozzle 43, to maintain slurry infeed 100 under pressure in the blast tube 4, and to induce a supersonic shockwave into the slurry infeed 100 as it exists the blast tube. According to an embodiment, the flotation cell 200 with blast tubes 4, or the flotation cells 200 with blast tubes 4, is/are the last flotation cell/s of the scavenger cleaner part 13.

The configuration of the scavenger part 12, as described above, is variable independently of the configuration of the scavenger cleaner part 13, as described above. In other words, the scavenger part 12 may comprise one or more flotation cells 200 with blast tubes 4, the scavenger cleaner part 13 may comprise one or more flotation cells 200 with blast tubes 4, or both may comprise one or more flotation cells 200 with blast tubes 4, as well as any number and type of scavenger flotation cells 120 or scavenger cleaner flotation cells 130, respectively, in the scope defined by the embodiments described herein.

The flotation line 10 may also comprise a rougher part 11 with one or more rougher flotation cells 110 for the separation of slurry into underflow 400 and overflow 500. The rougher part 11 may comprise at least two rougher flotation cells 110, or 2-7 rougher flotation cells 110, or 2-5 rougher flotation cells 110. The overflow 500 is arranged to flow directly into a cleaner flotation line (not shown in the figures). In case there are more than one rougher flotation cells 110, overflows of a number of rougher flotation cells 110 may be combined and then arranged to flow into the cleaner flotation line. The underflow 400 from a last rougher flotation cell 110 is arranged to flow into the scavenger part 12 as slurry infeed. The slurry infeed may comprise fresh slurry 2 to be combined with the slurry fraction 300 from a flotation cell 200 with blast tubes 4 prior to feeding it into a flotation cell 200 with blast tubes 4 as infeed slurry 100. Alternatively, the slurry infeed may be fed directly to a preceding flotation cell 120, 200.

All in all, the flotation line 10 may comprise at least three flotation cells 110, 120, 130, 200. The flotation line 10 may comprise 3 to 10 flotation cells 110, 120, 130, 200. The flotation line 10 may comprise 4 to 7 flotation cells 110, 120, 130, 200.

The flotation cells 110, 120, 130, 200 of the flotation line 10 are connected in series and arranged in fluid communication so that a subsequent flotation cell is arranged to receive underflow 400 from a previous flotation cell as slurry infeed, or, in the case of a flotation cell 200 with blast tubes 4, alternatively, as a part of a slurry infeed 100 comprising a slurry fraction 300 from the flotation cell 200 with blast tubes 4 and fresh slurry 2, which is the underflow 400 of the previous flotation cell.

Overflow 500 for a scavenger flotation cell is arranged to flow into a regrinding step 91 and then into the scavenger cleaner flotation part 13. In case there are more than one scavenger flotation cells 120, overflows 500 of a number of scavenger flotation cells 120 may be combined and then arranged to flow into the regrinding step 91 (see FIG. 2). Overflow 500 from a flotation cell 200 with blast tubes 4 (in a scavenger line 12 or in a scavenger cleaner line 13) may be arranged to flow into a cleaner flotation line (not shown in the figures). In case there are more than one flotation cells 200 with blast tubes, their overflows 500 may be combined and arranged to flow into the cleaner flotation line (see FIG. 2). Alternatively, overflow(s) 500 of a flotation cell 200 or flotation cells 200 in the scavenger line 12 may be combined with the overflow(s) of the scavenger flotation cell(s) 120 and arranged to flow into the regrinding step 91. Yet alternatively, overflow 500 of one flotation cell 200 with blast tubes 4 may be combined thus, while overflow 500 of another flotation cell 200 with blast tubes 4 may be led to a cleaner line (see FIG. 3). Further, overflows 500 or some overflows 500 of flotation cells 200 with blast tubes 4 may be arranged to flow into a separate regrinding step 91, and from there, into further processing (see FIG. 4).

Overflow 500 for a scavenger cleaner flotation cell is arranged to flow into further processing according to state of the art. Overflow 500 from a flotation cell 200 with blast tubes 4 in a scavenger cleaner line 13 may be arranged to flow into a cleaner flotation line (not shown in the figures). Alternatively, overflow(s) 500 of a flotation cell 200 or flotation cells 200 in the scavenger line 13 may be combined with the overflow(s) of the scavenger cleaner flotation cell(s) 130 and arranged to flow into further processing (see FIG. 3). Further, overflows 500 or some overflows 500 of flotation cells 200 with blast tubes 4 in the scavenger cleaner part 13 may be arranged to flow into a separate regrinding step 91, and from there, into further processing (see FIG. 4).

Underflow 400 from a last scavenger flotation cell 120 of the flotation line 10, as well as underflow 400 from a last scavenger cleaner flotation cell of the flotation line 10 is arranged to be removed from the flotation line 10 as tailings 800. Overflows 500 of the flotation cells 110, 120, 130, 200 may comprise a concentrate, and underflows 400 of the flotation cells 110, 120, 130, 200 may be arranged to flow into the tailings 800 (either directly or indirectly through treatment in a number of subsequent flotation cells). The flows of slurry, for example underflow 400 from a previous flotation cell 110, 120, 130, 200 may be arranged to be led into a subsequent flotation cell by gravity. Alternatively or additionally, a low-head pump may be utilized in transferring the flows of slurry.

At least 30% of the flotation volume in the flotation line 10 comprises a mechanical agitator 70 comprising a system for introducing flotation gas into the flotation cell. In an embodiment, at least 60% of the flotation volume in the flotation line 10 comprises a mechanical agitator 70. For example, depending on the aggregate volume of the flotation cells in the flotation line 10, and the volume of individual flotation cells 110, 120, 130, 200 within the flotation line 10, 33% of the flotation cells, 40% of the flotation cells, 50% of the flotation cells, or 67% of the flotation cells, or 75% of the flotation cells, may comprise a mechanical agitator 70.

The flotation line 10 may be preceded by other processes such as grinding, classification, screening, heavy-medium process, coarse particle recovery process, spirals, and other separation processes; and other flotation processes. A number of processes may follow the flotation line 10, such as regrinding, cleaner or other flotation processes, centrifuging, filtering, screening or dewatering.

According to another aspect of the invention, the flotation line 10 may be used in recovering particles comprising a valuable material suspended in slurry. In an embodiment, the use may be directed to recovering particles comprising nonpolar minerals such as graphite, sulphur, molybdenite, coal, talc.

According to another embodiment, the use may be directed to recovering particles comprising polar minerals.

In a further embodiment, the use is directed to recovering particles from minerals having a Mohs hardness of 2 to 3, such as galena, sulfide minerals, PGMs, REO minerals. In a yet further embodiment, the use is specifically directed to recovering particles comprising platinum.

In a further embodiment, the use is directed to recovering particles comprising copper from mineral particles having a Mohs hardness of 3 to 4. In a yet further embodiment, the use is specifically directed to recovering particles comprising copper from low grade ore.

The flotation line 10 described herein is particularly suitable for, but not limited to, use in recovering valuable mineral containing ores, where the mineral ore particles comprise copper (Cu), zinc (Zn), iron (Fe), pyrite, or a metal sulfide such as gold sulfide. Mineral ore particles comprising other valuable mineral such as Pb, Pt, PGMs (platinum group metals Ru, Rh, Pd, Os, Ir, Pt), oxide mineral, industrial minerals such as Li (i.e. spodumene), petalite, and rare earth minerals may also be recovered according to the different aspects of this invention.

The flotation line 10 is suitable for use in recovering mineral ore particles comprising a valuable mineral, particularly from low grade ore. The flotation line 10 is particularly suitable for recovering mineral ore particles comprising Cu from low grade ore. The flotation line 10 is also suitable for recovering mineral ore particles comprising Fe by reverse flotation.

According to a further aspect of the invention, a flotation plant comprises a flotation line 10 according to this specification. In an embodiment, the flotation plant may comprise at least two flotation line 10. In an embodiment, the flotation plant may comprise at least three flotation lines 10. In an embodiment, the flotation plant may comprise at least one first flotation line 10 for the recovery of a first concentrate, and at least one second flotation line 10 for the recovery of a second concentrate.

The flotation plant may comprise a flotation line 10 arranged to recover particles comprising Cu from minerals having a Mohs hardness from 3 to 4. In particular, such a flotation line 10 may be arranged to recover particles comprising Cu from low grade ore. Alternatively or additionally, the flotation plant may comprise a flotation line 10 arranged to recover particles from minerals having a Mohs hardness of 2 to 3, such as galena, sulfide minerals, PGMs and/or REO minerals. In particular, such a flotation line 10 may be arranged to recover particles comprising Pt.

The flotation plant may further comprise an arrangement for further treating the mineral ore particles suspended in slurry so that the second concentrate is different from the first concentrate. In an embodiment, the arrangement for further treating the mineral ore particles may be a grinding step disposed between a first flotation line 10 and a second flotation line 10. In an embodiment, the arrangement for further treating the mineral ore particles may be an arrangement for the addition of flotation chemicals, disposed between a first flotation line 10 and a second flotation line 10.

The embodiments described hereinbefore may be used in any combination with each other. Several of the embodiments may be combined together to form a further embodiment. An arrangement, a method, a plant or a use, to which the disclosure is related, may comprise at least one of the embodiments described hereinbefore. It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A flotation line for treating mineral ore particles suspended in slurry, comprising a scavenger part with at least two scavenger flotation cells for the separation of slurry into a first underflow and a first overflow; and a scavenger cleaner part comprising at least two scavenger cleaner flotation cells for the separation of slurry into a second overflow and a second underflow wherein the first overflow from the scavenger flotation cells is arranged to flow into a regrinding unit and then into the scavenger cleaner part;

the first underflow from the last scavenger flotation cell of the flotation line and the second underflow from the last scavenger cleaner flotation cell of the flotation line is arranged to be removed from the flotation line as tailings;

at least 30% of the flotation volume in the flotation line comprises a mechanical agitator comprising a system for introducing flotation gas into the flotation cells;

the flotation cells of the flotation line are connected in series and arranged in fluid communication so that a subsequent flotation cell is arranged to receive the first or the second underflow from a previous flotation cell as slurry infeed;

wherein the scavenger part or the scavenger cleaner part comprises a flotation cell with blast tubes for introducing slurry infeed into the flotation cell; or in that the scavenger part or the scavenger cleaner part is followed by the flotation cell with the blast tubes for introducing slurry infeed into the flotation cell; the flotation cell with the blast tubes configured to receive the first underflow from the scavenger flotation cell or the second underflow from the scavenger cleaner flotation cell as slurry infeed; and wherein each of the blast tubes comprises an inlet nozzle for feeding a slurry infeed into the blast tube, an inlet for pressurized gas, the slurry infeed subjected to the pressurized gas as it is discharged from the inlet nozzle, an elongated chamber arranged to receive under pressure the slurry infeed, and an outlet nozzle configured to restrict flow of slurry infeed from the outlet nozzle, to maintain slurry infeed in the elongated chamber under pressure, and to induce a supersonic shockwave into the slurry infeed as it exits the blast tube.

2. The flotation line according to claim 1, wherein it further comprises a rougher part with a rougher flotation cell for the separation of slurry into a third underflow and a third overflow, the third overflow arranged to flow directly into a cleaner flotation line, and the third underflow from a last rougher flotation cell is arranged to flow into the scavenger part as slurry infeed.

3. The flotation line according to claim 2, wherein the rougher part comprises at least two flotation cells.

4. The flotation line according to claim 1, wherein at least 60% of the flotation volume in the flotation line comprises the mechanical agitator comprising the system for introducing flotation gas into the flotation cell.

5. The flotation line according to claim 1, wherein the scavenger part comprises the flotation cell with blast tubes.

6. The flotation line according to claim 5, wherein the flotation cell with blast tubes is preceded by the scavenger flotation cell.

7. The flotation line according to claim 5, wherein the flotation cell with blast tubes is preceded by the scavenger flotation cell comprising the mechanical agitator.

8. The flotation line according to claim 5, wherein the flotation cell with blast tubes is preceded by a further flotation cell with blast tubes.

9. The flotation line according to claim 5, wherein the flotation cell with blast tubes is the last flotation cell of the scavenger part.

10. The flotation line according to claim 1, wherein the scavenger cleaner part comprises the flotation cell with blast tubes.

11. The flotation line according to claim 10, wherein the flotation cell with blast tubes is preceded by the scavenger cleaner flotation cell.

12. The flotation line according to claim 10, wherein the flotation cell with blast tubes is preceded by the scavenger cleaner flotation cell comprising the mechanical agitator.

13. The flotation line according to claim 11, wherein the scavenger cleaner flotation cell is preceded by a Jameson cell in which the size range of the flotation gas bubbles is 0.4 to 1.2 mm; or a further flotation cell with blast tubes, in which the size range of the flotation gas bubbles is 0.05 to 0.7 mm.

14. The flotation line according to claim 11, wherein the scavenger cleaner flotation cell is preceded by a further flotation cell with blast tubes configured to restrict flow of slurry infeed from an outlet nozzle, to maintain slurry infeed under pressure in the blast tube, and to induce a supersonic shockwave into the slurry infeed as it exits the blast tube.

15. The flotation line according to claim 10, wherein the flotation cell with blast tubes is the last flotation cell of the scavenger cleaner part.

16. The flotation line according to claim 10, wherein the scavenger part comprises the flotation cell with blast tubes.

17. The flotation line according to claim 16, wherein the flotation cell with blast tubes is preceded by the scavenger flotation cell.

18. The flotation line according to claim 16, wherein the flotation cell with blast tubes is preceded by the scavenger flotation cell comprising the mechanical agitator.

19. The flotation line according to claim 16, wherein the flotation cell with blast tubes is preceded by a further flotation cell with blast tubes.

20. The flotation line according to claim 16, wherein the flotation cell with blast tubes is the last flotation cell of the scavenger part.

21. The flotation line according to claim 1, wherein the overflows of the flotation cells comprise a concentrate, and the underflows of the flotation cells are arranged to flow into the tailings.

22. The flotation line according to claim 1, wherein the underflow from the previous flotation cell is arranged to be led into the subsequent flotation cell by gravity.

23. The flotation line according to claim 1, wherein the scavenger part comprises 2-7 flotation cells.

24. The flotation line according to claim 1, wherein the scavenger cleaner part comprises 2-6 flotation cells.

25. The flotation line according to claim 1, wherein the ratio of height (H) of the flotation cell with blast tubes, the height measured as the distance from the bottom of a flotation tank of the flotation cell to a launder lip of the flotation tank, to diameter (D) of the flotation cell with blast tubes, the diameter measured at a distance of the outlet nozzle of the blast tube from the bottom of the flotation tank, (H/D) is 0.5 to 1.5.

26. The flotation line according to claim 1, wherein the volume of the flotation cell with blast tubes is at least 10 $m^3$.

27. The flotation line according to claim 1, wherein the flotation cell with blast tubes comprises 2-40 blast tubes.

28. A flotation plant comprising a flotation line according to claim 1.

29. The flotation plant according to claim 28, wherein the plant comprises at least two, or at least three flotation lines according to claim 1.

30. The flotation plant according to claim 28, wherein the flotation line is arranged to recover particles from minerals having a Mohs hardness of 2 to 3.

31. The flotation plant according to claim 30, wherein the flotation line is arranged to recover particles comprising Pt.

32. The flotation plant according to claim 28, wherein the flotation line is arranged to recover particles comprising Cu from minerals having a Mohs hardness from 3 to 4.

33. The flotation plant according to claim 32, wherein a flotation line is arranged to recover particles comprising Cu from ore.

* * * * *